US012468842B2

(12) United States Patent
Horwitz et al.

(10) Patent No.: US 12,468,842 B2
(45) Date of Patent: Nov. 11, 2025

(54) APPLICATION CAPABILITIES AND DATA SHARING

(71) Applicant: Comcast Cable Communications, LLC, Philadelphia, PA (US)

(72) Inventors: Michael Horwitz, Seattle, WA (US); Benjamin E. Greenberg, Rydal, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 233 days.

(21) Appl. No.: 18/169,502

(22) Filed: Feb. 15, 2023

(65) Prior Publication Data

US 2024/0273234 A1    Aug. 15, 2024

(51) Int. Cl.
G06F 15/16 (2006.01)
G06F 9/54 (2006.01)
G06F 21/62 (2013.01)
H04L 29/06 (2006.01)

(52) U.S. Cl.
CPC .............................. *G06F 21/6245* (2013.01)

(58) Field of Classification Search
CPC .................................................. G06F 21/6245
USPC ......................................................... 706/26
See application file for complete search history.

(56) References Cited

U.S. PATENT DOCUMENTS

| | | | | |
|---|---|---|---|---|
| 7,440,918 | B2 * | 10/2008 | Boyle | G06Q 30/0206 705/37 |
| 12,063,210 | B1 * | 8/2024 | Maeng | H04L 63/083 |
| 2008/0137548 | A1 * | 6/2008 | Hassan | H04W 28/18 370/252 |
| 2012/0311131 | A1 * | 12/2012 | Arrasvuori | G06F 21/6245 709/224 |
| 2013/0276142 | A1 * | 10/2013 | Peddada | H04L 63/105 726/28 |
| 2015/0135170 | A1 * | 5/2015 | Murray | G06F 9/44536 717/148 |
| 2017/0053130 | A1 * | 2/2017 | Hughes | G06F 21/6245 |
| 2017/0068784 | A1 * | 3/2017 | Sullivan | G16H 10/60 |
| 2021/0394050 | A1 * | 12/2021 | Nishimura | A63F 13/75 |
| 2022/0294787 | A1 * | 9/2022 | Montemurro | H04L 63/20 |
| 2022/0365765 | A1 * | 11/2022 | Ayuba | G06F 9/45537 |
| 2023/0078197 | A1 * | 3/2023 | Barton | G06F 16/122 726/26 |
| 2023/0096672 | A1 * | 3/2023 | Bhat | G06F 21/6218 726/27 |
| 2023/0289457 | A1 * | 9/2023 | Kvalnes | G06F 21/6245 |
| 2024/0045987 | A1 * | 2/2024 | Archer, III | G06F 21/6245 |
| 2024/0281558 | A1 * | 8/2024 | Carette | H04L 63/205 |
| 2024/0378307 | A1 * | 11/2024 | Dcosta | G06F 21/604 |
| 2024/0396798 | A1 * | 11/2024 | Mangla | H04L 41/147 |

\* cited by examiner

*Primary Examiner* — Hamza N Algibhah
(74) *Attorney, Agent, or Firm* — Banner & Witcoff, Ltd.

(57) ABSTRACT

Systems, apparatuses, and methods are described for data sharing between applications. A first application may attempt to access data associated with a second application, an operating system, and/or a cloud service. An operating system may determine whether to grant access based on one or more factors such as device capability, an application declaration, a user setting, a user acknowledgement, and/or a data sharing policy.

25 Claims, 15 Drawing Sheets

| OS Method | Capability |
|---|---|
| setVolume(int volume) | SET_VOLUME |
| Search(String text) | FEDERATED_SEARCH |
| hasCapability(String capabilityName) | n/a |
| registerClosedCaptionListener(Listener listener) | CLOSED_CAPTION_STATE_CHANGES |

APPLICATION CAPABILITIES AND DATA SHARING

BACKGROUND

Personal data may be used to increase the effectiveness of advertisement and/or other services, but device capabilities (e.g., camera, location tracking etc.) for collecting personal data and use or sharing of personal data should be controlled to prevent misuse or unwanted sharing. For example, a user or other entity associated with an application may have determined that it is appropriate to use personal data in connection with that application, but may not have agreed that such data should be shared with all other applications or used for any purpose. There may also be multiple other entities associated that application, a platform on which the application operates, etc., and all of those entities may have different policies associated with sharing of data. Determining whether data may be shared consistent with all such policies may be difficult.

SUMMARY

The following summary presents a simplified summary of certain features. The summary is not an extensive overview and is not intended to identify key or critical elements.

Systems, apparatuses, and methods are described for determining whether, and/or an extent to which, different applications may share data. The determination may be based on one or more capabilities, policies, configurations, rules, and/or other parameters that may be defined for or otherwise associated with the applications. Sharing of data by applications can also be based on operating systems used by the applications, and application stores or distributors associated with the applications, etc. An application seeking data from another application may request that data using a method call. The method call may be processed (e.g., by an operating system) to determine if access to the requested data complies or conflicts with any of relevant capabilities, policies, configurations, rules, and/or other parameters. If there is no conflict, data access may be allowed. If there is a conflict with any of the defined parameters, data access or sharing may not be allowed. An end user may also be prompted to authorize access. The applications, operating system, various configurations and manifests associated with applications, and/or other data may be updated based on whether access is allowed.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
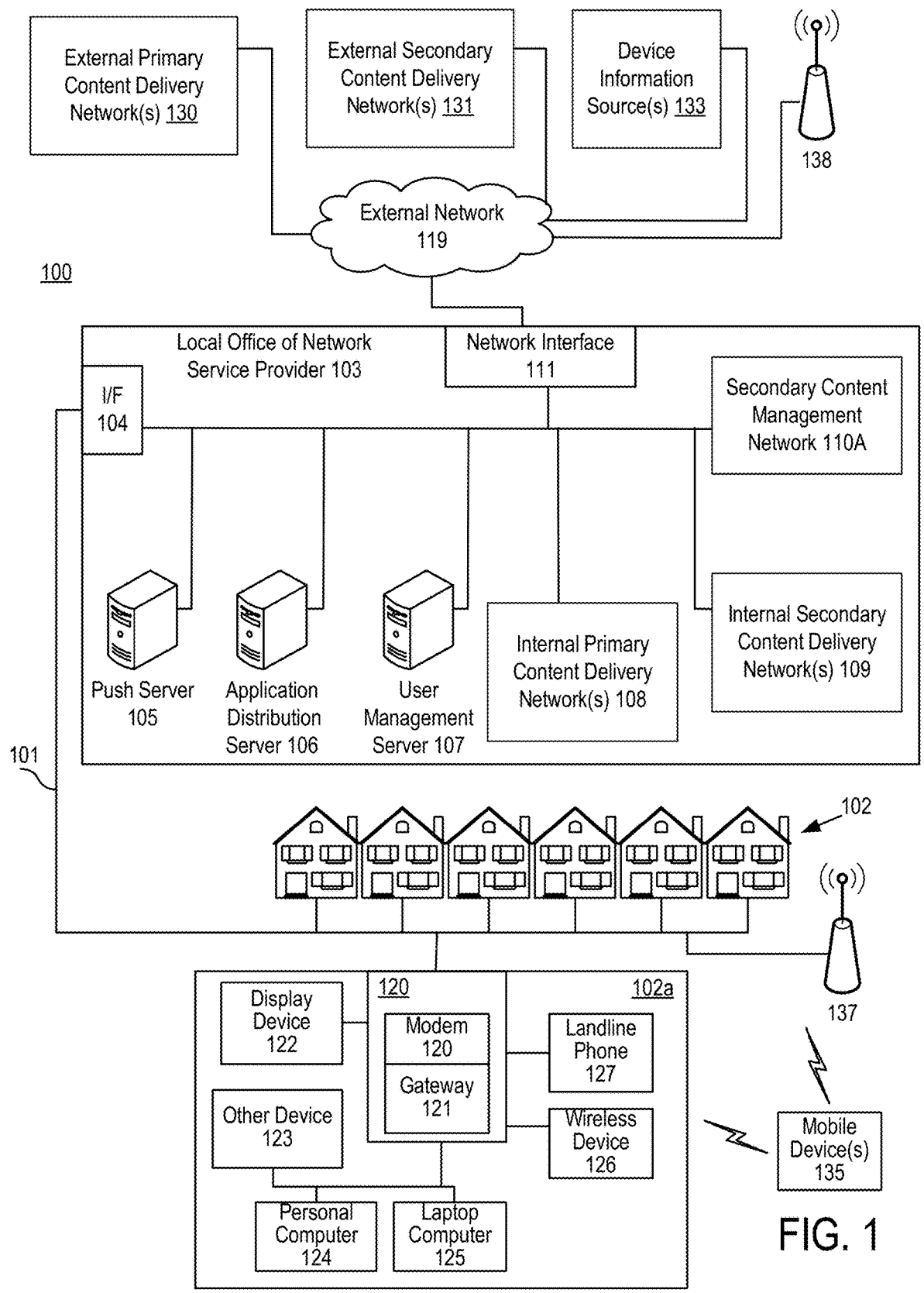
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 of a network service provider in which features described herein may be implemented. The communication network 100 may comprise one or more information distribution networks of any type, such as, without limitation, a telephone network, a wireless network (e.g., an LTE network, a 5G network, a Wi-Fi IEEE 302.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend) of the network service provider. The local office 103 may send downstream information signals and receive upstream information signals via the communication links 101. Each of the premises 102 may comprise devices, described below, to receive, send, and/or otherwise process those signals and information contained therein. The communication network 100 provided by the network service provider may enable the devices (e.g., user devices, networking devices) in premises 102 to communicate with other devices in the premises 102 and/or communicate with the local office 103.

The communication links 101 may originate from the local office 103 and may comprise components not shown, such as splitters, filters, amplifiers, etc., to help convey signals clearly. The communication links 101 may be coupled to one or more wireless access points 137 configured to communicate with one or more mobile devices 135 via one or more wireless networks. The mobile devices 135 may comprise smartphones, tablets, or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as devices 105-109, 110A, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS), or an integrated cable modem termination system (I-CMTS)), one or more digital subscriber line access modules (DSLAMs), and/or any other computing device(s).

The local office 103 may comprise one or more network interfaces 111 that comprise circuitry needed to communicate via the external networks 109. The external networks 109 may comprise networks of Internet devices, telephone networks, wireless networks, wired networks, fiber optic networks, and/or any other desired network. The local office 103 of the network service provider may also or alternatively communicate with the mobile devices 135 via the interface 111 and one or more of the external networks 109, e.g., via one or more of the wireless access points 138.

An internal primary content delivery network 108 (which may be part of the local office 103 or in communication with the local office 103) may be configured to provide primary content items to devices in the premises 102 and/or to the mobile devices 135. The internal primary content delivery network 108 and any other networks disclosed herein may include one or more computing devices. Primary content items stored in the primary content delivery network 108 may comprise movies, television programs, online video programming, Internet radio, any variety of audio files, etc. The primary content delivery network 108 may also store various video games that may be accessed by devices in the premises 102 via the communication link 101. The primary content items stored in the primary content delivery network 108 may include a single title or selection (e.g., a single song, a single video program, or a single video game title or portion thereof) or a collection of programs (e.g., an entire album, several episodes of a television program, different 'chapters' of a single video as it might otherwise appear on a DVD, or various levels of a video game). In addition, the internal primary content delivery network 108 may comprise software to validate user identities and entitlements, locate and retrieve requested primary content, and/or initiate delivery (e.g., streaming) of the primary content.

An internal secondary content delivery network 109 (which may be part of the local office 103 or in communication with the local office 103) may be configured to provide secondary content (e.g., advertisements, promotions, infomercials, banners, hyperlinks, public service announcements, etc.) to devices in the premises 102 and/or to the mobile devices 135. The secondary content items stored at the internal secondary content delivery network 109 may include downloadable content such as video data, audio data, still image data, binary program data, or any combination of the above that is not otherwise primary content. Examples of secondary content items include advertisements, which may be made up of video images, animations, sounds, applets, and any other variety of features (e.g., HTML links in an advertisement to a site for purchase of a particular advertised product).

Additionally, or alternatively, one or more external primary content delivery network(s) 130 and/or one or more external secondary content delivery networks 131 may be accessible via the external network 119. The external primary content delivery networks 130 and/or the external secondary content delivery networks 131 may be configured to communicate with the devices 105-109, 110A in the local office 103 and/or with computing devices located in or otherwise associated with one or more premises 102. The external primary content delivery networks 130 may be similar to the internal primary content delivery networks 108 and provide primary content items to devices in the premises 102 and/or mobile devices 135. Similar to the internal secondary content delivery network 109, the external secondary content delivery network 131 may provide secondary content items to devices in the premises 102 and/or mobile devices 135.

Devices in the premises 102 and/or the mobile devices 135 may comprise software applications (also referred to as an "app") to request primary content items from the internal primary content delivery networks 108 and/or the external primary content delivery networks 130. The internal primary content delivery networks 108 and/or the external primary content delivery networks 130 may send the requested primary content items to the applications. Applications may cause display and/or output of the requested primary content items to users of the devices in the premises 102 and/or to the mobile devices 135. An application may be configured to request primary content from a corresponding one of the primary content delivery networks 108 and/or a corresponding one of the external primary content delivery networks 130. The devices in the premises 102 and/or the mobile devices 135 may download the applications from an application distribution server 106 or one or more application distribution servers located outside the local office 103. The application distribution server 106 may be a server that provides various applications for downloading. Although the network service provider may maintain its own internal secondary content delivery networks 109, secondary content items may also be delivered from one or more external secondary content delivery networks 131. Some of the external secondary content delivery networks (e.g., advertisement networks) may be associated with applications installed or present in user devices.

Users of a device in the premises 102 and/or of the mobile devices 135 may create user accounts with the network service provider maintaining the local office 103. The account information for each created user account may be maintained in the user management server 107. The user management server 107 may store profile information for each user account, including a unique account identifier identifying the user account, personal information, username, password, email address, home address, credit card information, banking information, etc. The user management server 107 may also include account management information, such as data storage locations, security settings, personal configuration settings, etc. In addition, the user management server 107 may be responsible for monitoring user content viewing habits and collecting information from that monitoring for use in selecting primary and second content items.

A secondary content management network 110A, which may be part of the local office 103 or otherwise in communication with the local office 103, may be responsible for managing the delivery of secondary content items to devices in the premises 102 and/or to the mobile devices 135. For example, the secondary content management network 110A may generate and manage tokens for user devices in the premises 102 and/or the mobile devices 135. In addition, the secondary content management network 110A may store various rules provided by the network service provider of the local office 103, other network service providers, and/or various applications. A user device in the premises 102 and/or the mobile devices 135 may send a request to the secondary content management network 110A for a token, and the secondary content management network 110A may generate a token for the device based on the stored rules. For example, the network service provider may provide rules that specify generating one token for all devices of each user account of the network service provider, tokens for each device of a user account, and/or tokens for each application installed in a user device.

User devices in the premises 102 and/or the mobile devices 135 may request secondary content items from the secondary content management network 110A by using the tokens assigned to the devices. The secondary content management network 110A may be responsible for requesting the secondary content items from various secondary content delivery networks (e.g., the internal secondary content delivery networks 109 and/or the external secondary content delivery networks 131), receiving the secondary content items from the secondary content delivery networks, and forwarding the secondary content items to the user devices. The user devices in the premises 102 and/or the mobile devices 135 may receive the secondary content items and insert the secondary content items in a video or audio stream of a primary content item being displayed or outputted by the devices.

The secondary content management network 110A may store various rules provided by the network service provider of the local office 103, other network service providers, and/or various applications for routing requests for the secondary content items to one of the many available secondary content delivery networks (e.g., the internal secondary content delivery networks 109 and/or the external secondary content delivery networks 131). For example, the network service provider of the local office 103 may provide a rule for the secondary content management network 110A to forward every request from a particular application in some or all user devices in the premises 102 and the mobile devices 135 to the internal secondary content delivery network 109. Also, or alternatively, the network service provider of the local office 103 may provide a rule for the secondary content management network 110A to forward every request from another application in some or all user devices in the premises 102 and the mobile devices 135 to an external secondary content delivery network 131 associated with the other application. As another example, the network service provider of the local office 103 may provide a rule for the secondary content management network 110A to forward some of the requests to the internal secondary content delivery network 109 (e.g., 60% of the requests) and some of the requests to an external secondary content delivery network 131 associated with the application (e.g., 40% of the requests). The secondary content management network 110A may use the rules provided by the network service provider of the local office 103, other network service providers, and/or various applications for routing requests for the secondary content items to one of the many available secondary content delivery networks (e.g., the internal secondary content delivery networks 109 and/or the external secondary content delivery networks 131).

The secondary content management network 110A may be configured to divide revenue, gained by outputting the secondary contents to the user devices in the premises 102 and/or to the mobile devices 135, among different recipients of the revenue. The recipients may be the network service providers, entities (e.g., companies) providing and/or otherwise associated with various applications installed in the user devices in the premises 102 and/or to the mobile devices 135, entities providing and/or otherwise associated with external primary or secondary content delivery networks, any manufacturer and/or retailer of the user devices in the premises 102 and/or to the mobile devices 135, etc. The secondary content management network 110A may also be connected to the device information sources 133 via the external network 119 to receive information about user devices in the premises 102 and/or the mobile devices 135 from the manufacturers or retailers of the devices. The secondary content management network 110A may store various rules provided by the network service provider and/or other recipients for dividing the revenue. For example, the network service provider of the local office 103 may provide a rule for the secondary content management network 110A to assign all the revenue to the network service provider. Alternatively, the network service provider of the local office 103 may provide a rule for the secondary content management network 110A to assign all the revenue to the entity providing and/or otherwise associated with the application displaying the secondary content items. As another example, the network service provider of the local office 103 may provide a rule for the secondary content management network 110A to assign a portion of the revenue to the network service provider, a portion of the revenue to the entity providing and/or associated with the application displaying the secondary content items, and some portion to the manufacturers and/or retailers of the user and mobile devices.

The push notification server 105 may be configured to generate push notifications to deliver information to devices in the premises 102 and/or to the mobile devices 135. The local office 103 may comprise additional servers, such as the additional push, content delivery networks, application distribution servers, and/or other types of servers. Although shown separately, the push server 105, the application distribution server 106, the user management server 107, the internal primary content delivery network 108, the internal secondary content delivery network 109, the secondary content management network 110, and/or other server(s) may be combined. The devices 105-107, and/or devices associated with the internal networks 108, 109, 110A, and/or other devices, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 120, which may comprise transmitters and receivers used to communicate via the communication links 101 with the local office 103 of the network service provider. The modem 120 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 121. The modem 120 may be connected to, or be a part of, the gateway 121. The gateway 121 may be a computing device that communicates with the modem(s) 120 to allow one or more other devices in the premises 102*a* to communicate with the local office 103 and/or with other devices beyond the local office 103 (e.g., via the local office 103 and the external network(s) 109). The gateway 121 may comprise a set-top box (STB), digital video recorder (DVR), a digital transport adapter (DTA), a computer server, and/or any other desired computing device.

The gateway 121 may also comprise one or more local network interfaces to communicate, via one or more local networks, with devices in the premises 102a. Such devices may comprise, e.g., display devices 122 (e.g., televisions), other devices 123 (e.g., a DVR or STB), personal computers 124, laptop computers 125, wireless devices 126 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 127 (e.g., Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 302.11, IEEE 302.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 302.11 channels) to communicate with one or more of the mobile devices 135, which may be on- or off-premises.

The mobile devices 135, one or more of the devices in the premises 102a, and/or other devices may download one or more applications from the application distribution server 106. The mobile devices 135, one or more of the devices in the premises 102a, and/or other devices may request primary content items from the internal primary content delivery network 109 and/or the external primary content delivery network 130. The mobile devices 135, one or more of the devices in the premises 102a, and/or other devices may receive, store, output, and/or otherwise use assets. An asset may comprise a video, a game, one or more images, software, audio, text, webpage(s), and/or other content. Various devices shown in FIG. 1A, such as the other device 123, the personal computer 124, the laptop computer 125, the mobile device 135, etc., may run an OS (e.g., FIREBOLT) as described herein and/or any applications that are compatible with the OS. These applications may make a method call according to a software development kit (SDK) to request access to data stored in a different device. One or more of the networks 100, 119, 130, 131, 133, etc. as shown in FIG. 1 may be owned or associated with one or more platform owners, distribution partners, app partners, organizations, etc. as described herein. The push server 105, the application distribution server 106, and/or the user management server 107 may correspond to, for example, devices associated with platforms 308, products/services 310, operators 312, global application platform 302, app partners 402, distributors 404, global application platform 406, distribution portal 514, organizations 510, 512, OS 1106, OS or cloud service 1108, subscriber platform 1202, distribution platform 1204, distribution platform portal 1210, and/or data platform 1246.

The secondary content management network 110A may provide tokens and/or secondary content items to user devices (e.g., mobile devices) connected to networks provided by a single network service provider (e.g., the user devices in the premises 102 and/or the mobile devices 135 connected to networks provided the local office 103 of one network service provider). Also, or alternatively, a secondary content management network may provide tokens and/or secondary content items to devices connected to networks of multiple network service providers.

Figure 2:
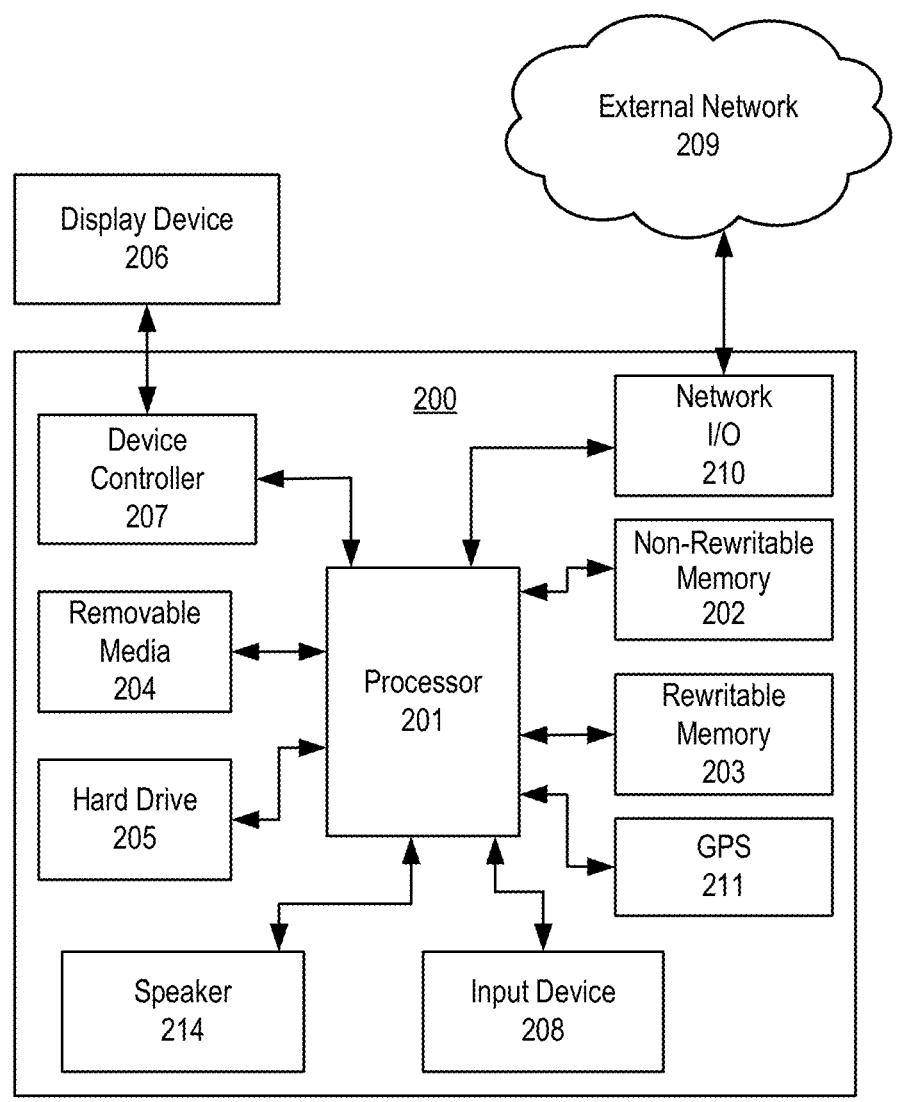
FIG. 2 shows hardware elements of a computing device.
Figure 3:
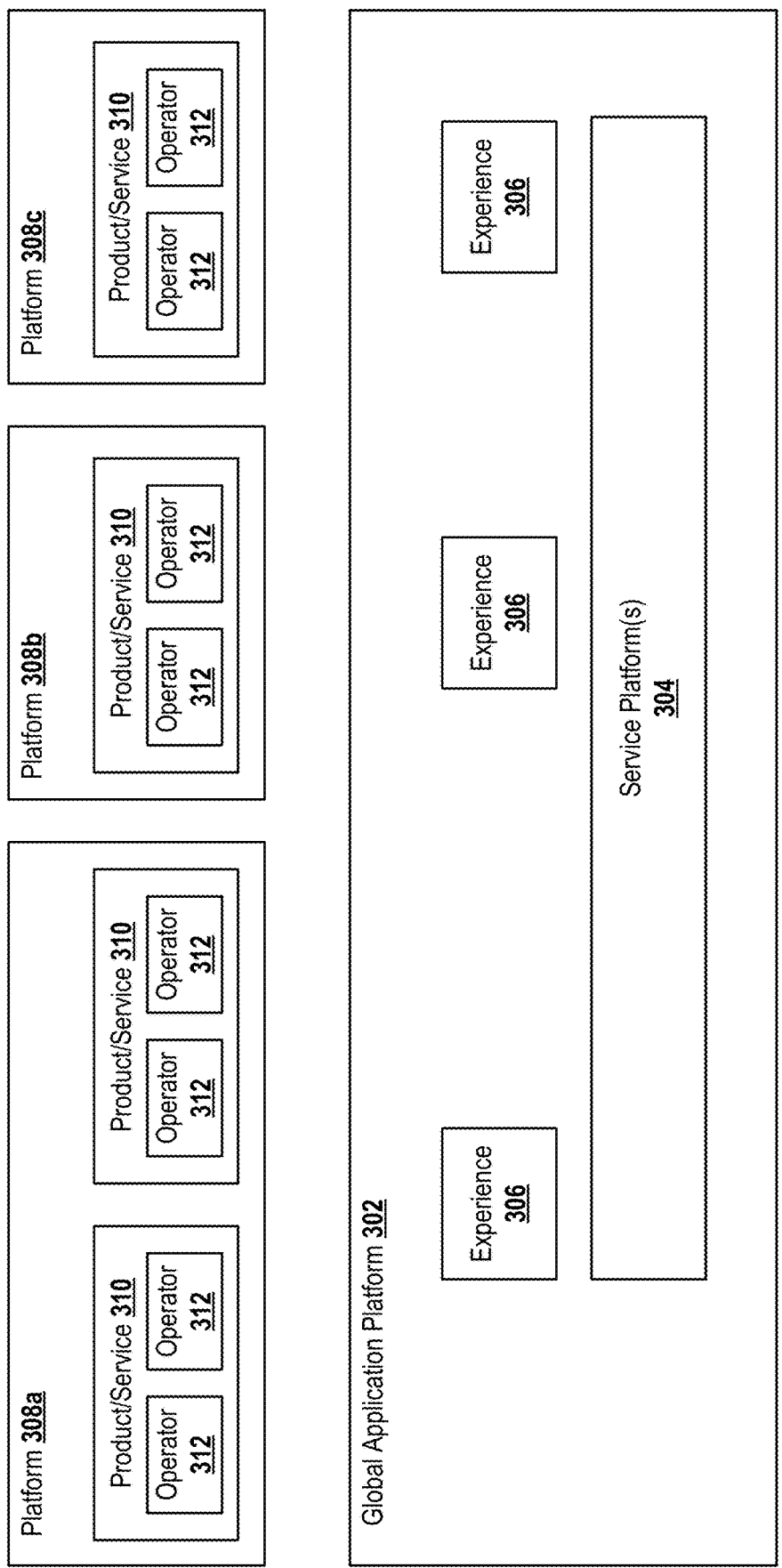
FIG. 3 shows an example global application platform.
Figure 5:
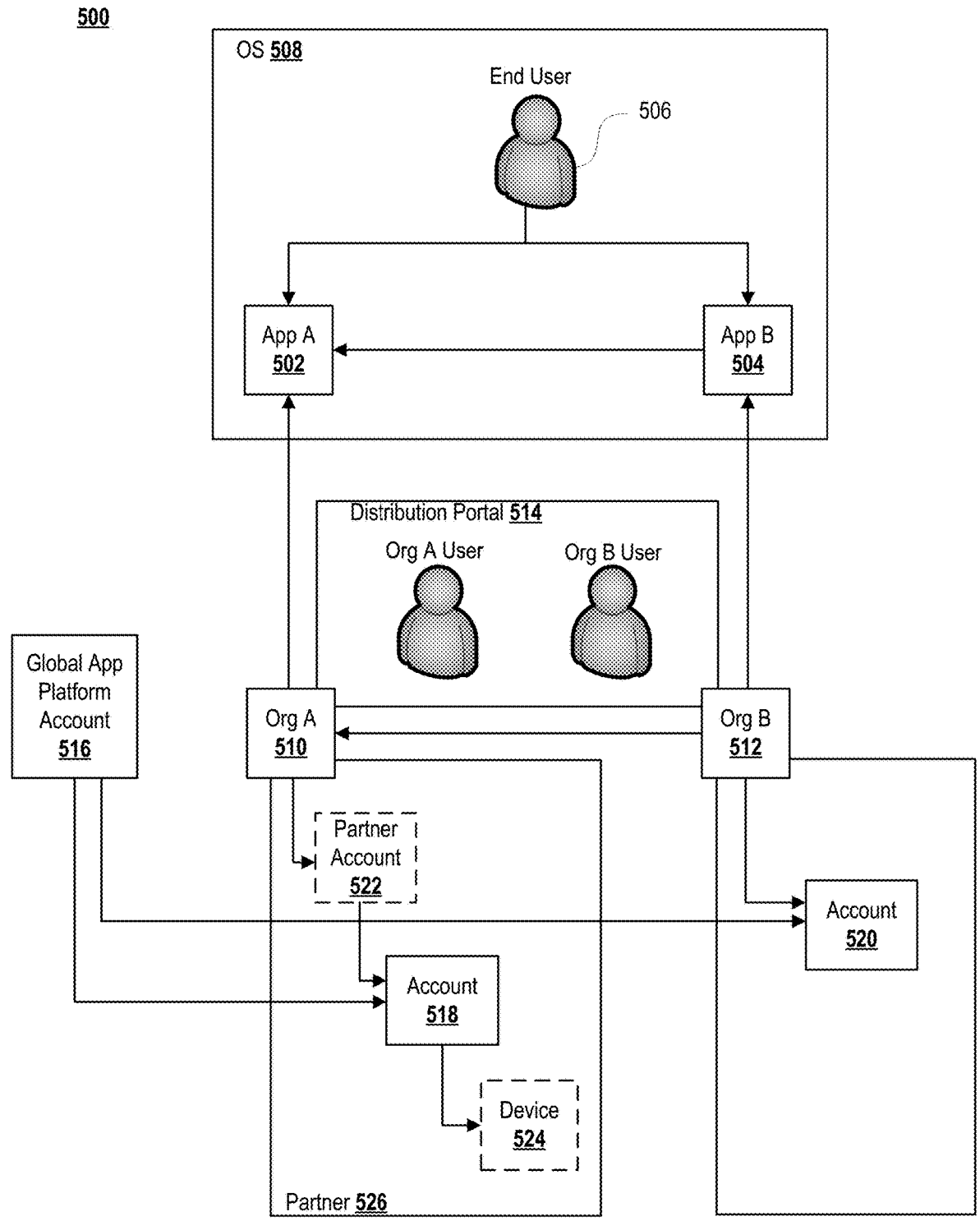
FIG. 5 shows examples of enabling data sharing between applications.
Figure 11A:
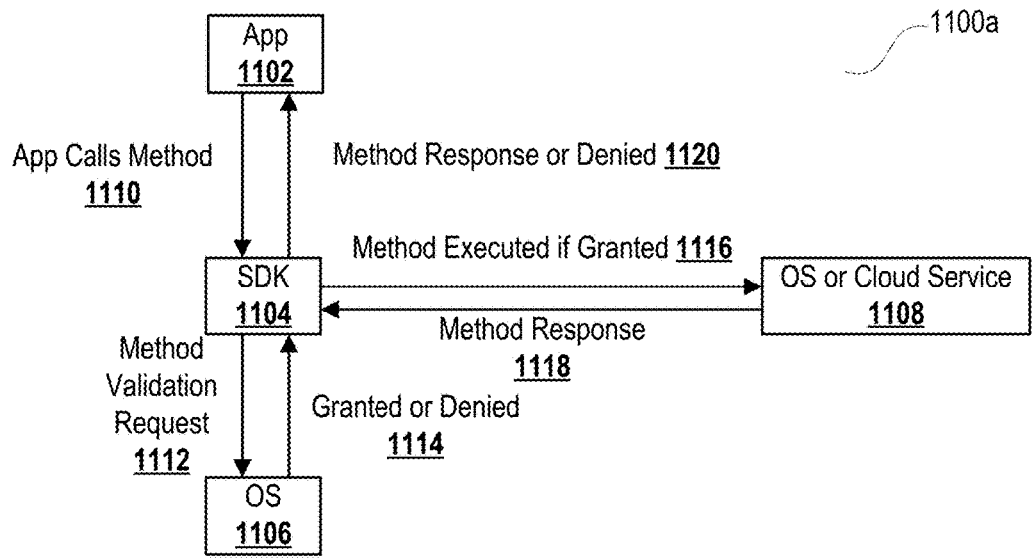
FIGS. 11A and 11B show examples of permission execution.
Figure 11B:
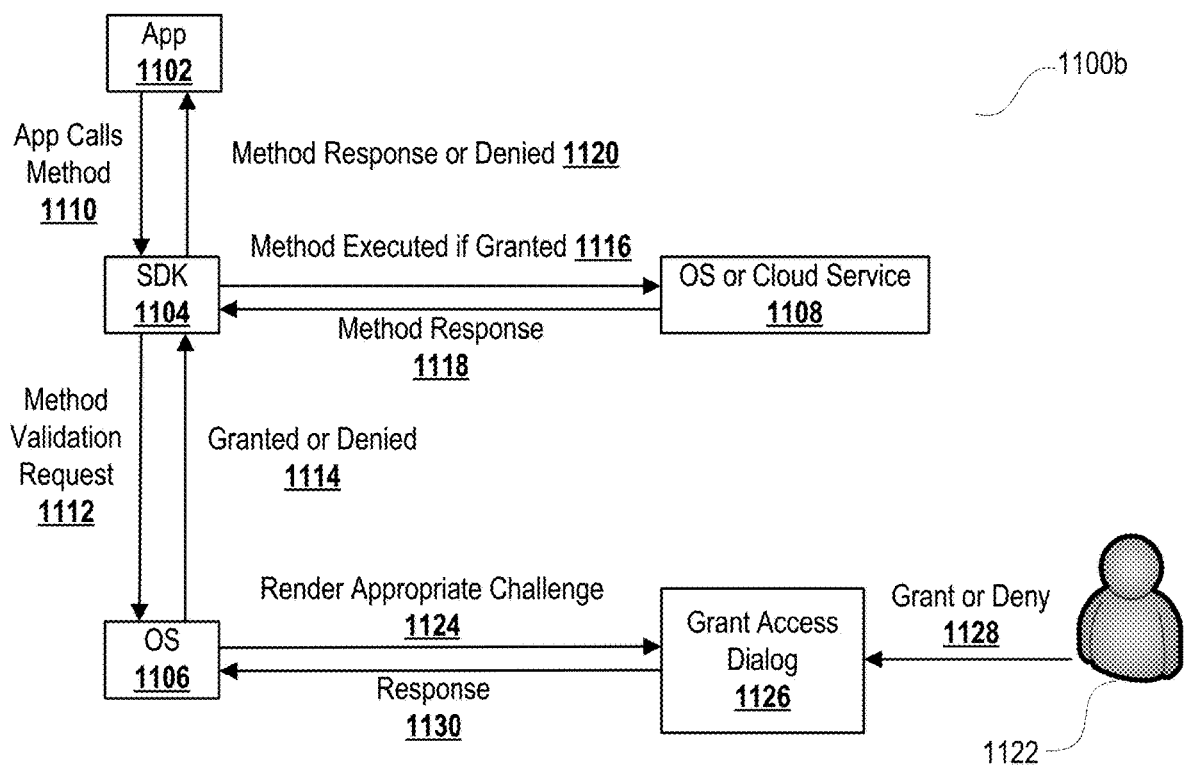
Figure 12:
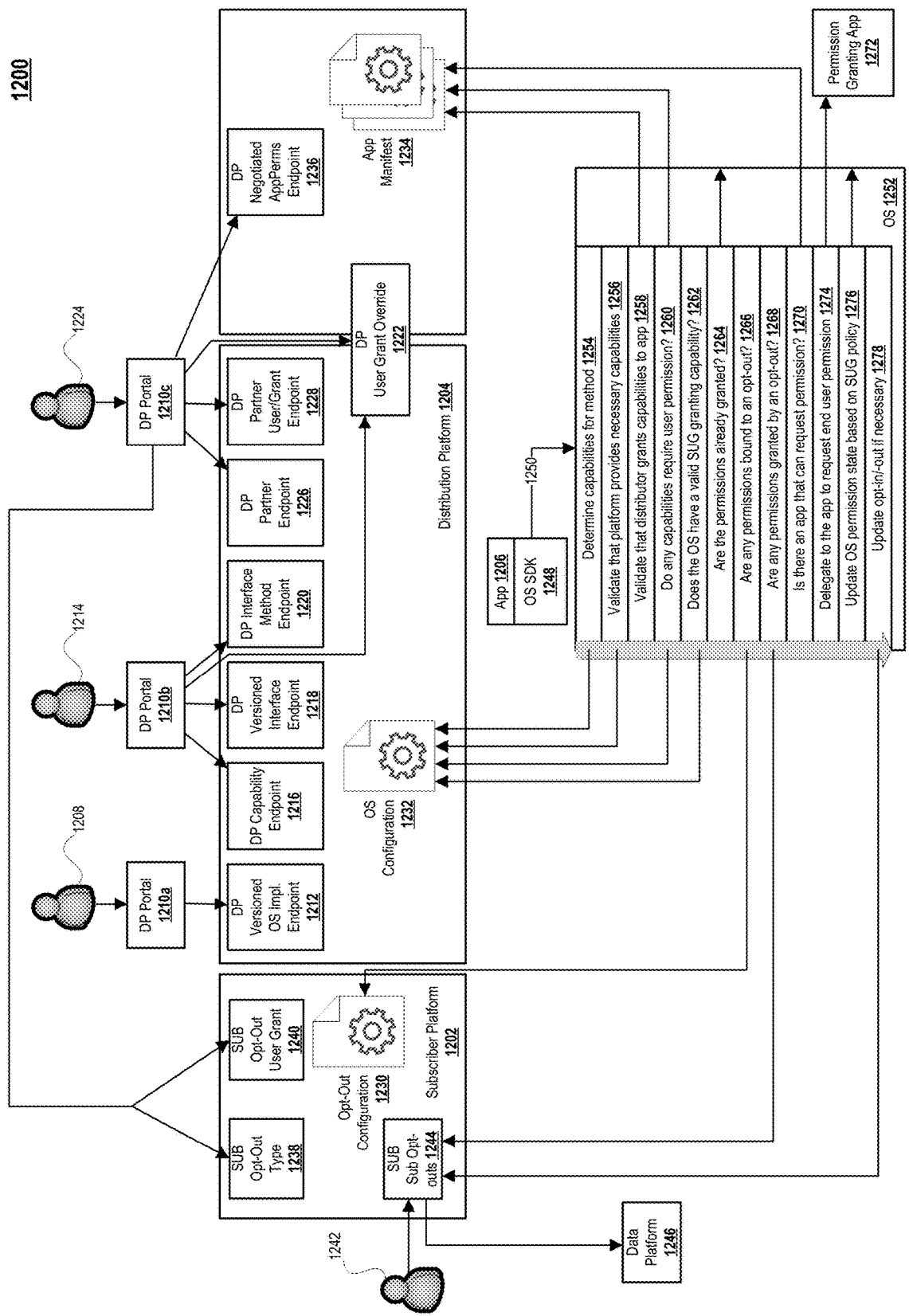
FIG. 12 shows examples of permissioning and policy execution.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109), any other computing devices, or computing devices executing software discussed herein (e.g., the platforms 308 and the global application platform 302 in FIG. 3; applications 502, 504, the OS 508, and the distribution portal 514 in FIG. 5; the app 1102, the SDK 1104, the OS 1106, and the OS or cloud service 1108 in FIGS. 11A and 11B; the various portals and endpoints, the apps 1206 and 1272, the platforms 1202, 1204, 1246, the OS SDK 1248, the OS 1252, etc. in FIG. 12). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random-access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

FIG. 3 shows an example global application platform 302. The global application platform 302 may be a mechanism for associating accounts and enabling data sharing across applications and platforms. The global application platform 302 may be a platform and/or service for the global app partner community to build, deploy, monetize, and optimize application experiences across various platforms and endpoints. A platform may be implemented as one or more computing devices and/or applications configured to provide a uniform experience for users to access and share content and/or data. A platform may communicate with one or more user devices via a network. For example, the global application platform 302 may provide through its service platform(s) 304 consistent user experience 306 to one or more platforms 308a, 308b, ... , 308n ("308"). The service platform(s) 304 may be based on an operating system, such as FIREBOLT developed by COMCAST CABLE COMMUNICATIONS LTD. of Philadelphia, Pennsylvania. Through the global application platform 302, the various platforms 308 may grow audience, increase their engagement, and monetize their engagement, including via first party streaming services. The global application platform 302 may intuitively provide reach and monetization to app partners, app aggregators, operators, etc. as platform owners. Each of the platforms 308 may be owned, operated, managed, and/or otherwise associated with a corporation, an enterprise, a business entity, and/or a service provider. The individual platforms 308 may be associated with one corporate entity or associated with two or more corporate entities. The platforms 308 may offer one or more products 310. The products 310 may be, for example, a retail television set or a retail set-top box that can provide services from one or more operators 312.

Individually, the platforms 308 may be fractured and their apps may be incompatible with each other, but the global application platform 302 may offer increased addressable market, increased speed to market, and increased cost-effectiveness. Specifically, the global application platform 302 may create scale by aggregating end users under a single app platform, and enable developers to build an app once and more quickly, and deploy broadly across multiple endpoints. The global application platform 302 may also reduce complexity and cost through a more efficient development and operating model.

Figure 4B:
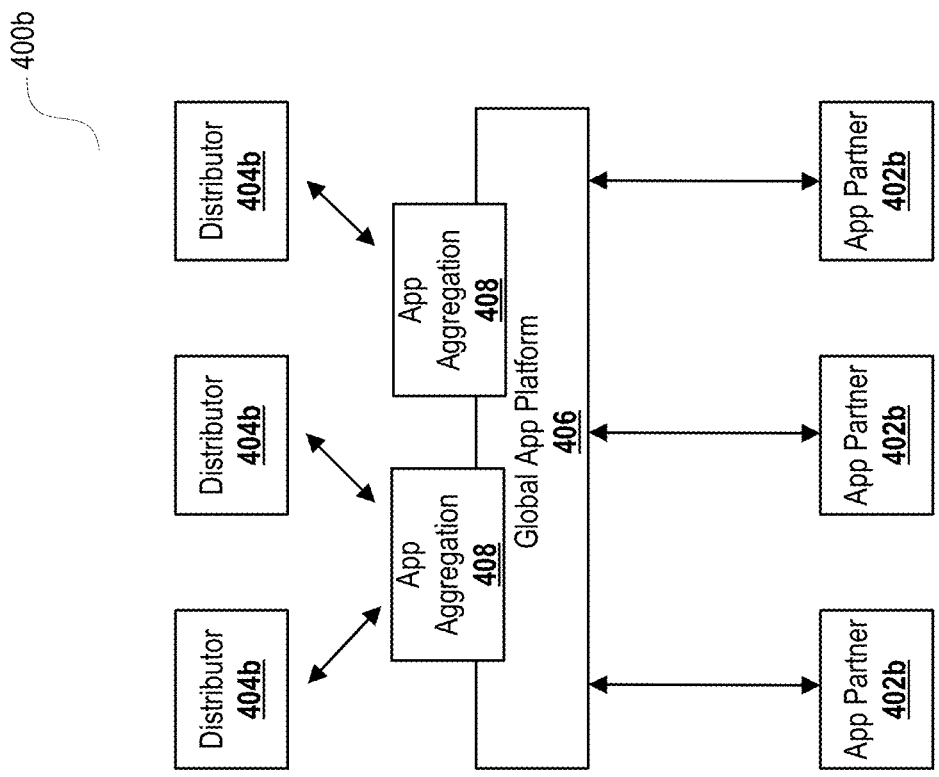
FIGS. 4A and 4B show example relationships between app partners and distributors.
Figure 4A:
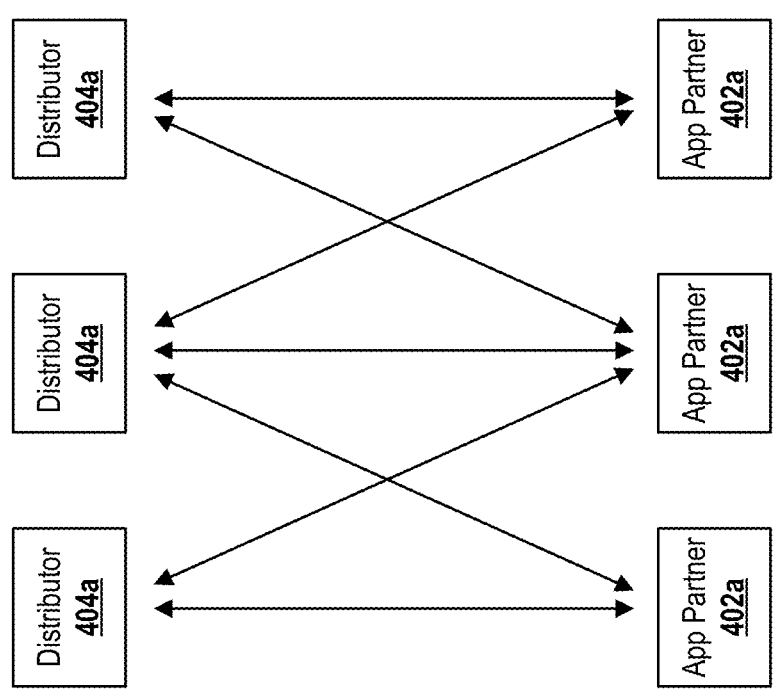

FIGS. 4A and 4B show example relationships between app partners and distributors. An app partner (also referred to as a content partner or an app publisher) may be an organization that controls an app's distribution rights. The app partners 402a may contract with one or more distributors 404a. In model 400a of FIG. 4A, app partners 402a may develop various applications for use in mobile devices, set-top boxes, television sets, personal computers (PCs), tablet devices, smartphones, smart appliances, etc. The distributors 404a may correspond to platforms 308 and/or operators 312 as shown in FIG. 3. A distributor (also referred to as a distribution partner or a distribution platform) may be an organization that provides devices (e.g., FIREBOLT-compliant devices) to end users. Distributors 404a (e.g., a source of apps accessible via a network, such as an application marketplace, etc.) may distribute one or more apps to end users of various devices. In the model 400a, the distributors 404a may own the apps that are provided to them by the app partners 402a. Thus, individual decisions may be locally optimized per distributor but result in the difficulty or inability to build and efficiently scale a common platform. In other words, each individual distributor 404a may not be incentivized to make decisions that are beneficial to the entire ecosystem of distributors 404a and app partners 402a. For example, it may be difficult for the distributors 404a to negotiate incompatible rights for a particular app (e.g., Distributor 1 and Distributor 2 may want the app to support contactless payment while Distributor 3 may not want the support). In another example, it may not be possible for a single app platform implementation to realize all the rights negotiated by the different distributors 404a.

On the other hand, in model 400b of FIG. 4B, one or more app partners 402b may submit their apps to a global application platform 406 that is situated between the app partners 402b and the one or more distributors 404b. Rather than the distributors 404a owning the apps, as was the case in model 400a, the distributors 404b in model 400b may rent (e.g., license) the apps rather than owning them. Instead, the global application platform 406 and/or the app partners 402b may retain ownership of the apps. The global application platform 406 may deploy one or more app aggregators 408 to aggregate apps and offer them to the distributors 404b. Under model 400b, the global application platform 406 may provide guidance for operating system (OS) to app integration and business negotiations between the app partners 402b and the distributors 404b. The global application platform 406 may also provide a mechanism for aggregation of app deals and terms of use across multiple distributors 404b. Thus, the distributors 404b can still enjoy the same level of feature velocity on their platforms as in model 400a.

FIG. 5 shows examples of enabling data sharing between applications. In system 500, App A 502 and App B 504 may be two applications that are attempting to share data between. App A 502 and App B 504 may be associated with (e.g., used by, owned by, etc.) an end user 506, but App A 502 and App B 504 may each be associated with a different user instead. App A 502 and App B 504 may run on an operating system (OS) 508. The OS 508 may be, for example, FIREBOLT developed by COMCAST CABLE COMMUNICATIONS LTD. of Philadelphia, Pennsylvania. App A 502 and App B 504 may be distributed by Organization A 510 and Organization B 512, respectively. Organization A 510 and Organization B 512 may correspond to, for example, the distributors 404b as shown in FIG. 4B. App B 504 may share its data with App A 502 if, for example, a data sharing policy is established between Organization A 510 and Organization B 512, if an account link exists between an App A 502 account and an App B 504 account, and/or if the end user 506 opted in to allow the data of App B 504 to be used by App A 502.

Organizations, such as Organization A 510 and Organization B 512, in a distribution portal 514 may define organization data sharing policies. An organization may be an entity such as a distributor, app partner, or a global application platform controller. Specifically, an organization may specify (1) which organization is allowed to use data, (2) for each organization, what specific data type they are allowed to use, and/or (3) for each data type, for what purposes the organization is allowed to use the data. For example, Organization B 512 may declare an organization data sharing policy that allows Organization A 510 to use the phone number data of Organization B 512 in the distribution portal 514 for ad targeting.

System 500 may provide clear ownership of data. For example, any data written by an app (e.g., App B 504) may be owned by the associated app partner (e.g., Organization B 512) and, by default, inaccessible to any parties other than the app partner and the global application platform. Explicit data sharing polices may be created and enforced based on agreements between app partners and distributors. For example, data sharing policies may dictate what user data an app is allowed to access from the distributor and/or provide to the distributor. An app partner may be an organization that controls an app's distribution rights. A distributor may be an organization that provides compliant devices to end users. A distributor may configure policies as its regulatory and/or other needs demand. An app partner may, for example, implement an app and have the appropriate policy enforced based on where the app runs (e.g., distributor, region, etc.). For example, for the same app, the app partner may enforce one set of data sharing policies for one distributor and enforce another different set of data sharing policies for a different distributor. The data associated with global application platform accounts (e.g., data associated with users) may be portable between devices.

In an example, a first app partner may want to limit access to customer postal code data to only apps that require such data contractually, while a second app partner may provide postal code data to all third-party apps. One distributor may want to display grid guides for users from a signed-in streaming app A, while another distributor may not wish to display the grid guide for a user from a signed-in streaming app B. Still yet another distributor may want to display grid guides for all signed-in apps. In another example, an app on a first app partner may provide usage data. Collection of data may be governed by a single opt-out for a distributor. The app on other app distributors may not provide usage data at all. Another app on those same app distributors may provide usage (e.g., video playback) data, and collection of data may be governed by, for example, a per-app opt-in that requires bi-annual renewal.

A global application platform account may have the ability to establish links to other accounts (e.g., third-party application accounts, distributor accounts, operator accounts, etc.) to facilitate data sharing between apps and/or app authentication portability between distributors. In system 500, for example, a global application platform account 516 may be linked to organization accounts 518 and 520. The account 518 may be associated with a partner account 522 (e.g., associated with a partner 526) and a device 524.

Figure 6A:
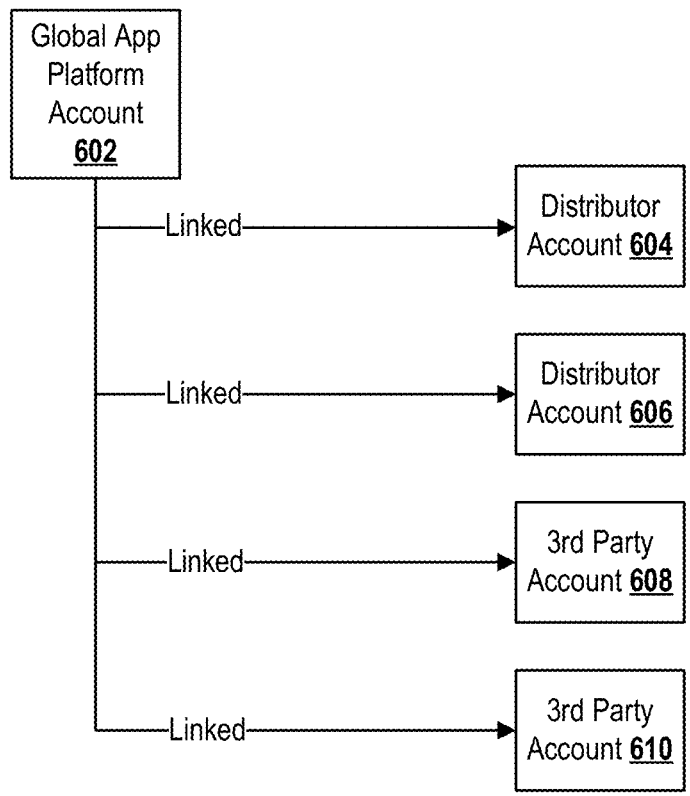
FIGS. 6A, 6B, 6C, 6D, 6E, and 6F show various configurations of account and/or device linking.
Figure 6B:
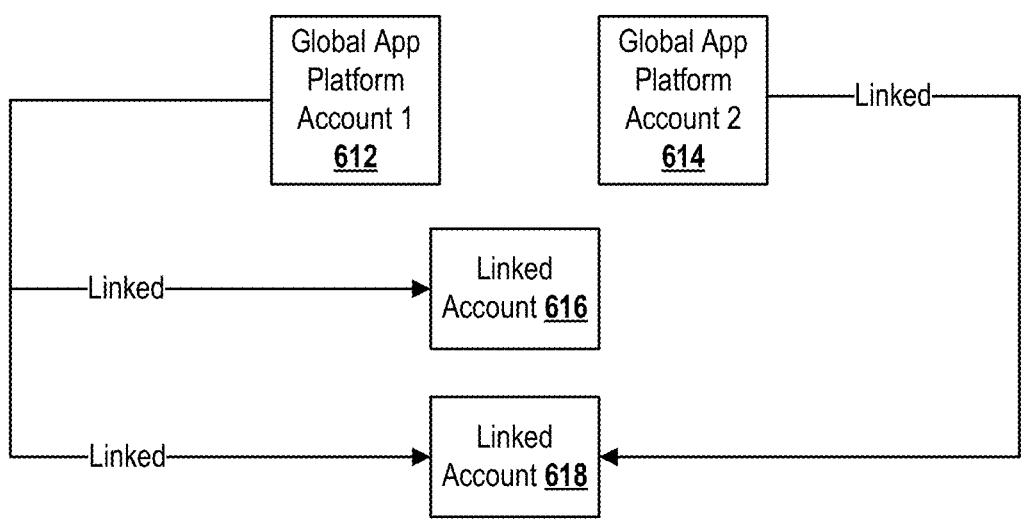

FIGS. 6A, 6B, 6C, 6D, 6E, and 6F show various configurations of account and/or device linking. In FIG. 6A, a global app platform account 602 may be linked to one or more operator accounts, such as distributor accounts 604, 606 (e.g., a first distributor account, a second distributor account), and third-party app accounts 608, 610 (e.g., a first app account, a second app account). As shown in FIG. 6B, while one single global application platform account 612 may be linked to one distributor or app account (e.g., third-party app account) 616, multiple global application platform accounts 612, 614 may be linked to one or more of the same distributor or app accounts 618. Any program that runs on top of an operating system (e.g., FIREBOLT) may be considered an application (also referred to as an app). Apps may include video streaming apps, and also include aggregated experience apps that allow a user to access multiple platforms and/or streaming services on a single app. An app may be a web app that runs in a web browser or a native app that is built for each device architecture (e.g., ARM, X86, AMD64, etc.). A relationship between a global application platform account and an operator account may be established via one or more of the following ways: (1) part of a device activation flow, (2) signing into an app within an aggregated experience, (3) an explicit account linking flow, and (4) in-home/network check. An app (e.g., a FIREBOLT-enabled app) may interact with required methods in the SDK (e.g., FIREBOLT SDK) and specify an app manifest (e.g., a FIREBOLT manifest).

Figure 6C:
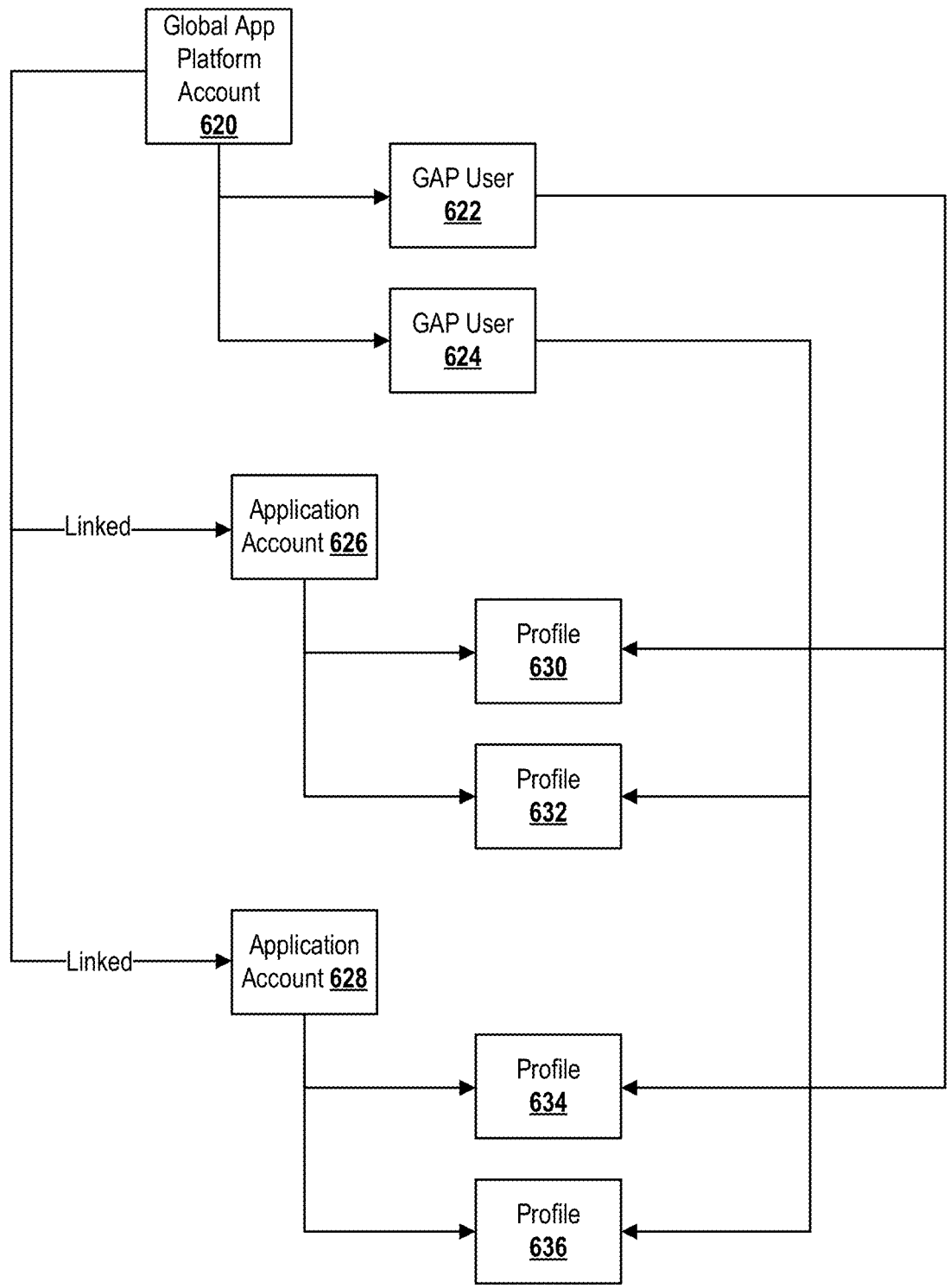

In FIG. 6C, users (e.g., user profiles) of a global application platform account may be linked to zero or more profiles associated with an application account or a distributor account. For example, a global application platform account 620 may have user profiles such as user profile 622 and user profile 624. The global application platform account 620 may have fewer or more user accounts than what is shown in FIG. 6C. The global application platform account 620 may be linked to application accounts such as the application account 626 and the application account 628. For example, the application account 626 may be an account for a first app and the application account 628 may be an account for a second app. Each of the app accounts may have zero or more user profiles. For example, the application account 626 may have profiles (e.g., user profiles) 630 and 632, and the application account 628 may have profiles (e.g., user profiles) 634 and 636. For example, the profiles 630, 632 may be user profiles for the first app, and the profiles 634, 636 may be user profiles for the second app. In the example shown in FIG. 6C, the global application platform user profile 622 may be associated with (e.g., linked to) the app profiles 630 and 634, and the global application platform user profile 624 may be associated with (e.g., linked to) the app profiles 632 and 636.

Figure 6D:
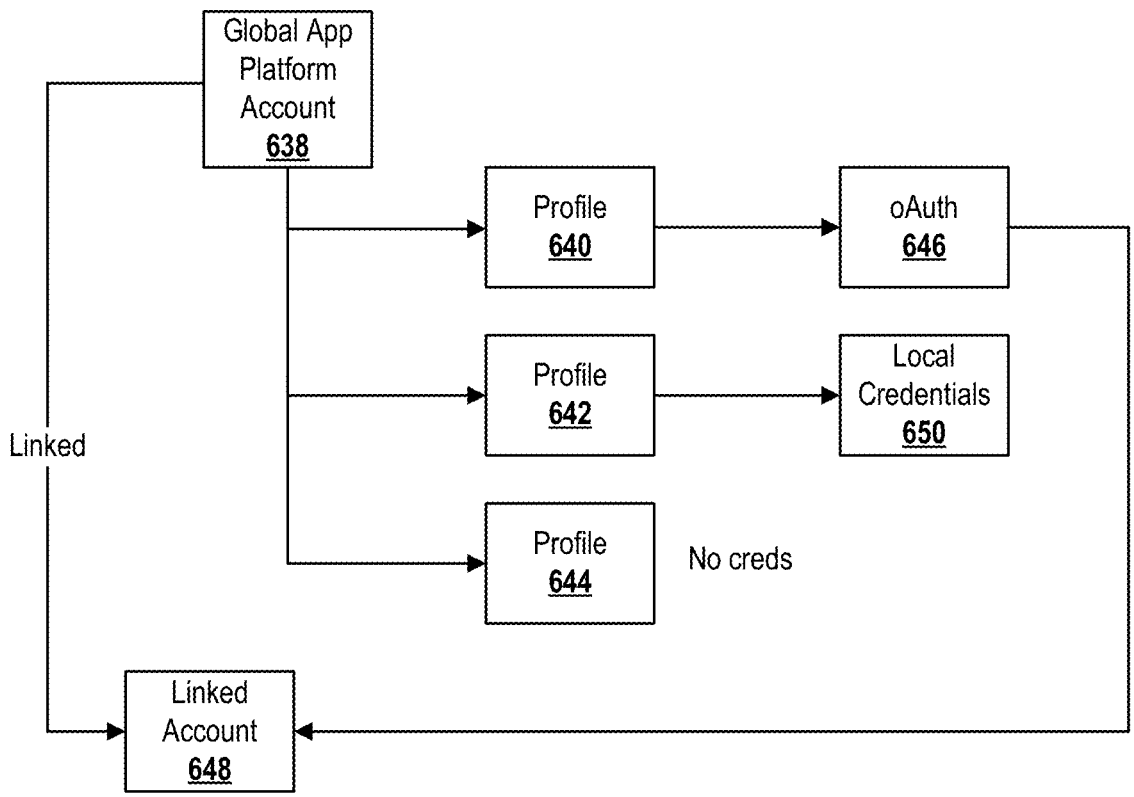

As shown in FIG. 6D, a single global application platform account 638 may be associated with one or more users having global application platform user profiles 640, 642, 644. At least one user profile (e.g., user profiles 640, 642) must have an authenticable identity associated for signing in the account 638. For example, user profile 640 may use Open Authorization (OAuth) 646 for federated login to a linked account 648, while user profile 642 may be authenticated against local credentials 650. Global application platform account 638 may have zero or more user profiles, such as a user profile 644, that do not have any credentials and could not be authenticated. For example, user profile 644 may be for a dependent child in a household that cannot be independently authenticated.

Figure 6E:
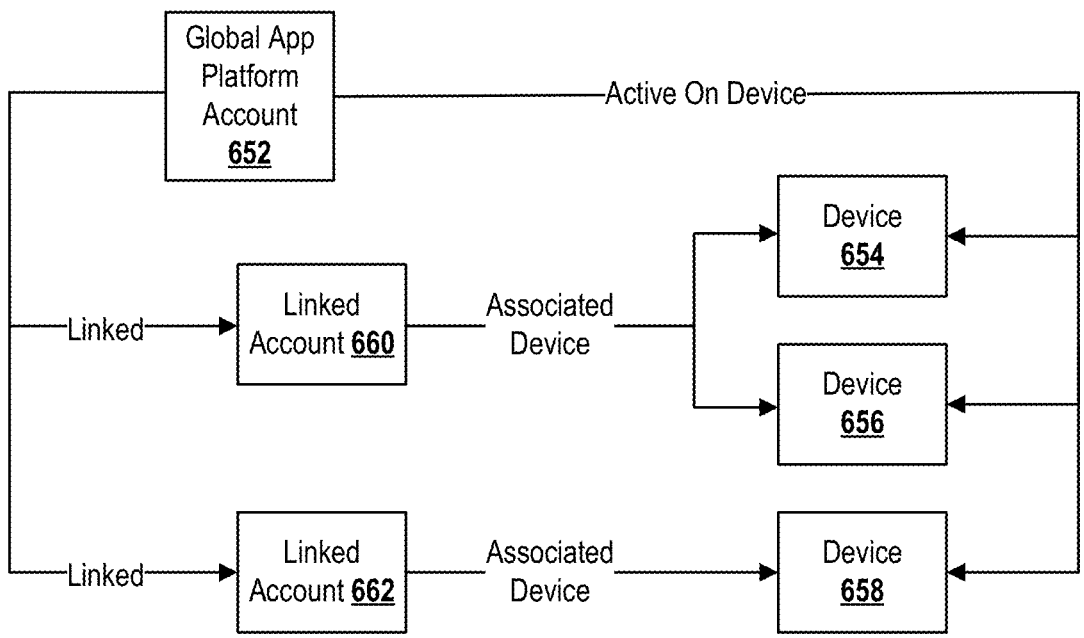
Figure 6F:
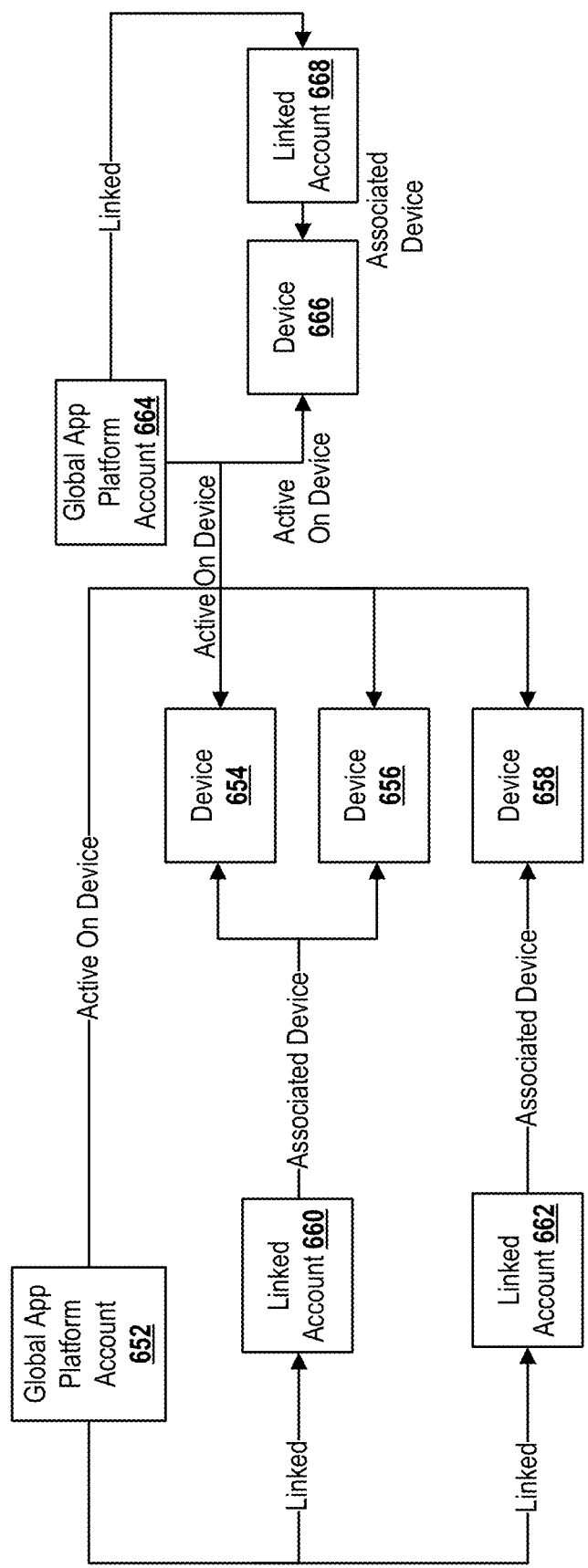

As shown in FIG. 6E, a global application platform account 652 may be active on zero or more devices, such as devices 654, 656, 658. The global application platform account 652 may be active on zero or more devices on a linked account. In the example shown in FIG. 6E, the devices 636, 656 may be associated devices of a linked account 660, and the device 658 may be an associated device of a linked account 662. The global application platform account 652 may have other linked accounts and/or associated devices not shown in FIG. 6E. A global application platform account may be active on any other OS-enabled (e.g., FIREBOLT-enabled) device. For example, as shown in FIG. 6F, a global application platform account 664 may be active on the device 654, which is associated with the linked account 660 (e.g., a first account for a distributor), and the global application platform account 664 may be also active on a device 666, which is associated with a linked account 668 (e.g., a second account for the distributor). The linked account 668 and the linked account 660 may be of the same distributor or app but may be two distinct accounts.

Figures 7, 8:
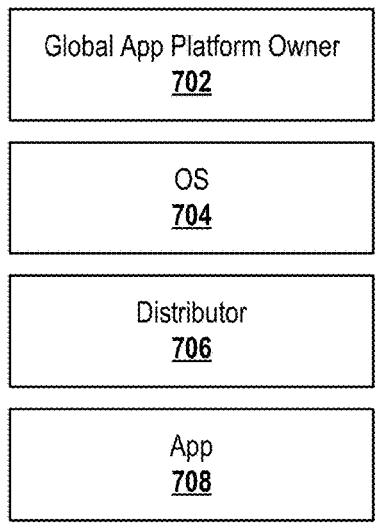
FIG. 7 shows some example roles fulfilled by various entities for executing permissions.
FIG. 8 shows some example methods and example capabilities that may be associated with each.

FIG. 7 shows some example roles fulfilled by various entities for executing permissions. When a method (also referred to as a function, a command, an operation, an application programming interface (API) call, etc.) that is called (e.g., by an app) does not require a particular capability (e.g., access to privacy-controlled data), each entity may have a different role with regard to execution of the particular method. The global application platform owner 702 may determine what OS method(s) are present (e.g., supported) in a particular version of the OS (e.g., FIREBOLT vA.B), determine what capabilities, if any, are needed to access (e.g., execute) those methods, and whether the OS could and/or must implement those methods. The global application platform owner 702 may be an administrator and/or a policy maker associated with the global application platform. The OS 704 (e.g., FIREBOLT) may determine whether the current state of the OS can satisfy the particular method call. The distributor 706 may determine whether the app calling the method is allowed to use the one or more capabilities. The app 708 may OS APIs that are permitted.

FIG. 8 shows some example methods and example capabilities that may be associated with each. Capabilities may be OS method calls supported by a computing device. For example, an OS method 802 (e.g., an OS method call, an OS function call, a system call, etc.) may be "setVolume(int volume)" for setting the volume level and may comprise and/or otherwise be associated with a "SET_VOLUME" capability 804. An OS method 806 may be "search(String text)" for performing a search and may comprise and/or otherwise be associated with a "FEDERATED_SEARCH" capability 808. An OS method 810 may be "hasCapability (String capabilityName)" for querying whether a particular OS implementation has a certain capability (e.g., represented by the "capabilityName" string value) and need not be associated with any capability to execute. An OS method 814 may be "registerClosedCaptionListener(Listener listener)" for registering a Closed Caption listening object and may comprise and/or otherwise be associated with a "CLOSED_CAPTION_STATE_CHANGES" capability 816. The OS methods 802, 806, 810, 814 may be part of the OS's software development kit (SDK) methods. A capability may be a functional ability and an associated usage policy, or an indication of such a functional ability and a usage policy. Capabilities may be related to, for example, various functional abilities, such as of a screen size, a screen resolution, a memory size, a processor speed, a network bandwidth, a microphone, a speaker, a camera, a sensor, an input device, wireless communication (e.g., Wi-Fi, near-field communication (NFC), Bluetooth, etc.), etc. and any of the associated usage policies. App capabilities of an app may be capabilities that the app must, should, and/or could provide, as declared via an OS specification. An app capability may comprise a usage of privacy-controlled data, as declared by the app. The app capabilities may be expressed in the app's manifest. The manifest may also indicate whether one or more distributors grant each of the capabilities. An OS capability may be a capability that an OS implementation must, should, and/or could provide, as declared by the OS specification. OS capabilities may be associated with OS SDK methods. A core OS SDK may provide methods to allow apps to understand available capabilities. Access to an OS capability may be governed by authorization to the API.

Certain capabilities may expose user data (e.g., privacy-controlled data) and may be configured to require user approval permit access. These capabilities may have an associated secure user grant policy. A secure user grant policy may be in the form of "before giving app <x> access to an OS capability, the end user must perform action <y>." For these types of capabilities and/or methods that are associated with these types of capabilities, the global application platform owner 702, the OS 704, the distributor 706, and the app 708 may fulfill the following roles. The global application platform owner 702 may define types of policies that the OS must and/or could support, and set initial policies associated with the capabilities. The OS 704 (e.g., FIREBOLT) may execute the policies, prompt the user for grants, and/or provide ability to manage secure user grants. The distributor 706 may override any secure user grant policies, create any opt-out types, and/or associate any opt-out types to secure user grant policies. The app 708 may make API calls if permitted. A platform capability may be declared by the OS specification (e.g., FIREBOLT specification) and the platform capability may be a capability that the platform implementation must, should, or could provide. Core OS SDK may provide methods to allow apps to understand (e.g., determine) available capabilities (e.g., provided by the platform implementation).

A secure user grant policy may define, for example, any acceptable actions by which an end user may grant access. For example, the end user may grant access by one or more of the following: an acknowledgement dialog, a personal identification number (PIN) dialog, an input of credentials, a one-time password (OTP), biometrics (e.g., fingerprint, facial recognition, iris recognition, etc.), navigating to another app that is responsible for satisfying the capability, an "allowed" privacy setting (e.g., opt-in), etc. A policy (e.g., a secure user grant policy) may define that a user needs to perform multiple actions (and which actions) to generate a secure user grant. A policy may define multiple valid actions and also define the preferred order of those actions. A secure user grant policy may define the scope for the grant. For example, the secure user grant policy may define whether the grant applies to all apps or to a specific set of one or more apps. A secure user grant policy may define the lifespan of the grant. For example, the secure user grant policy may define whether the grant is for a single use, while the app(s) are active, while the device(s) are active, until the grant is removed, for a specific time (e.g., time-to-live (TTL)), etc. The user may be prompted for the secure user grant when a method associated with a particular capability (e.g., a capability that exposes user data) is called, and/or when the app is launched for all capabilities that the app is associated with (e.g., the app requires). A secure user grant may be stored on a device. Persisted secure user grant(s) may be consulted as part of the permission execution phase. For example, users may be prompted for a grant if an active secure user grant does not already exist. The OS (e.g., FIREBOLT) may offer one or more methods and/or user interfaces for allowing users to manage their secure user grant(s). For example, a user may manage a secure user grant by listing any active secure user grants by application and capability, removing an active secure user grant, and/or removing all active secure user grants.

Secure user grant policies may be overridden for any specific distributor, any specific app, or a combination of both. The override (e.g., opt-in, opt-out, etc.) may be created by the global application platform (e.g., the global application platform owner) and/or a distributor. A distributor may be permitted to create overrides that apply to itself. For example, the READ_POSTAL_CODE capability for accessing the users' ZIP code data may not need user acknowledgement by default, but a distributor may create an override for requiring user acknowledgement for their users. Consequently, when an app makes a method call that is associated with the READ_POSTAL_CODE capability, the OS may prompt a user to grant the access for the distributor with the override but not for any other distributors. In another example, the BLUETOOTH_DEVICE_DISCOVER capability for discovering any nearby Bluetooth-capable devices may be associated with (e.g., require) user acknowledgement by default, but a distributor may ship an app that for which it is desirable for this capability to be pre-approved such that the app need not ask for user permission for this capability. Therefore, this particular app (but no other app unless specified) may use the BLUETOOTH_DEVICE_DISCOVER capability without prompting the user to grant access, but all other apps (unless otherwise specified) may need (e.g., may be required) to ask for the user's explicit grant of access.

A distributor may create any quantity of privacy setting types. A privacy setting may be an option related to privacy data that a user can either opt into or opt out of in advance. A privacy setting type may provide a way to define how the system behaves when a user either allows or denies a privacy setting of that type. A privacy setting type may support one or more of the following configurations: (1) which one or more capabilities are allowed or denied by the privacy setting, (2) whether the privacy setting for those capabilities is set as allowed or denied by default, (3) whether the privacy setting is tied to any accounts, devices, and/or users, and (4) a lifespan for how long an explicitly set privacy setting is valid. When a privacy setting is set to "allowed" by default, the associated capabilities may automatically have their secure user grants established. When a privacy setting is set to "denied" by default, the associated capabilities may automatically have their secure user grants revoked. For example, a distributor may opt users in to all instances of data sharing by apps. Users may individually opt out on a device or on a web portal. The opt-out may be used for capability access control and also on the backend for data access controls. In another example, a distributor may create a per-app privacy setting type that automatically expires every 2 years (e.g., for compliance with the Video Privacy Protection Act (VPPA)) associated with sharing usage data by an app. A different distributor, on the other hand, may create a privacy setting type across all apps that never expires associated with the same capabilities. The distributors may further finetune the privacy setting types by specifying specific accounts, devices, and/or users that the privacy setting types apply to.

Figure 9:
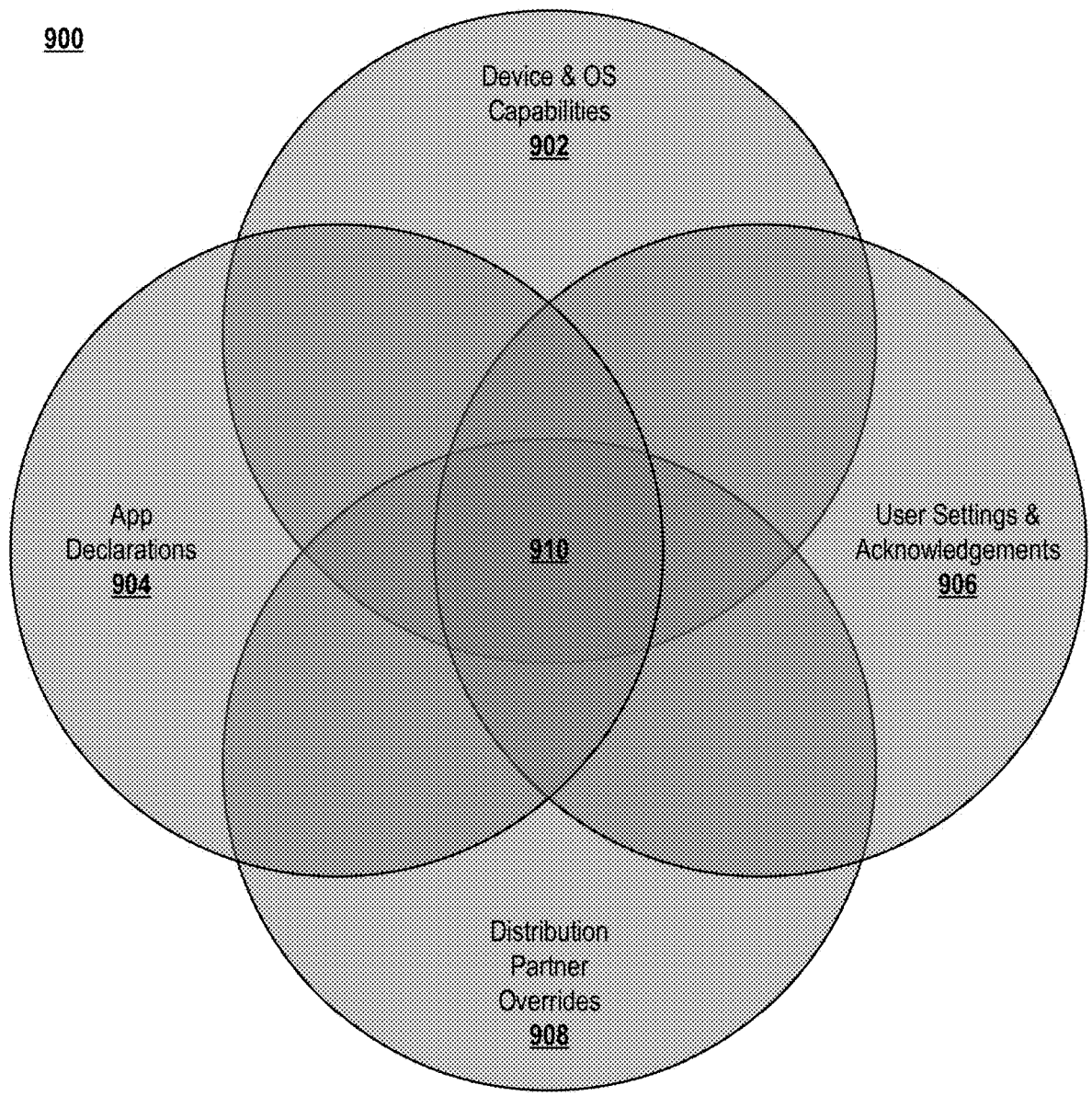
FIG. 9 shows example computation of available capabilities.

FIG. 9 shows example computation of available capabilities. A diagram 900 illustrates how a set of capabilities (e.g., configurations) available to an app may be determined. In the diagram 900, device and OS capabilities 902 may represent a set of capabilities that are physically supported and/or implemented by the device and the OS on which the app is running. For example, the device may support a microphone functionality but not a camera functionality. In another example, the OS may support a memory card access functionality but the device may physically lack a memory card reader. App declarations 904 may represent a set of capabilities that the app has declared (e.g., via an app manifest) to be required or optional. A manifest may be a file that an app provides (e.g., to the OS) in order for the app to be launched on the OS. The manifests may be created per app and/or per distributor. The manifest properties may provide information such as basic app information (e.g., name, identifier, version, type, family, rating, language), information on how to run the app (e.g., local hosting, cloud-based), launch configurations (e.g., browser settings), capabilities that the app offers and/or needs, capabilities that the distributor grants or uses, inter-app discoverability permissions, signatures (e.g., means by which the OS trusts the manifest), etc. User settings and acknowledgements 906 may represent a set of capabilities that the user may have granted by opting in (e.g., in advance), accepting an acknowledgement, and/or passing a challenge (e.g., a PIN prompt). Distribution partner overrides 908 may represent a set of capabilities that the distributor has overridden. Capabilities available to the app may be an intersection 910 of the device and OS capabilities 902, the app declarations 904, the user settings and acknowledgements 906, and distribution partner overrides 908.

Figure 10:
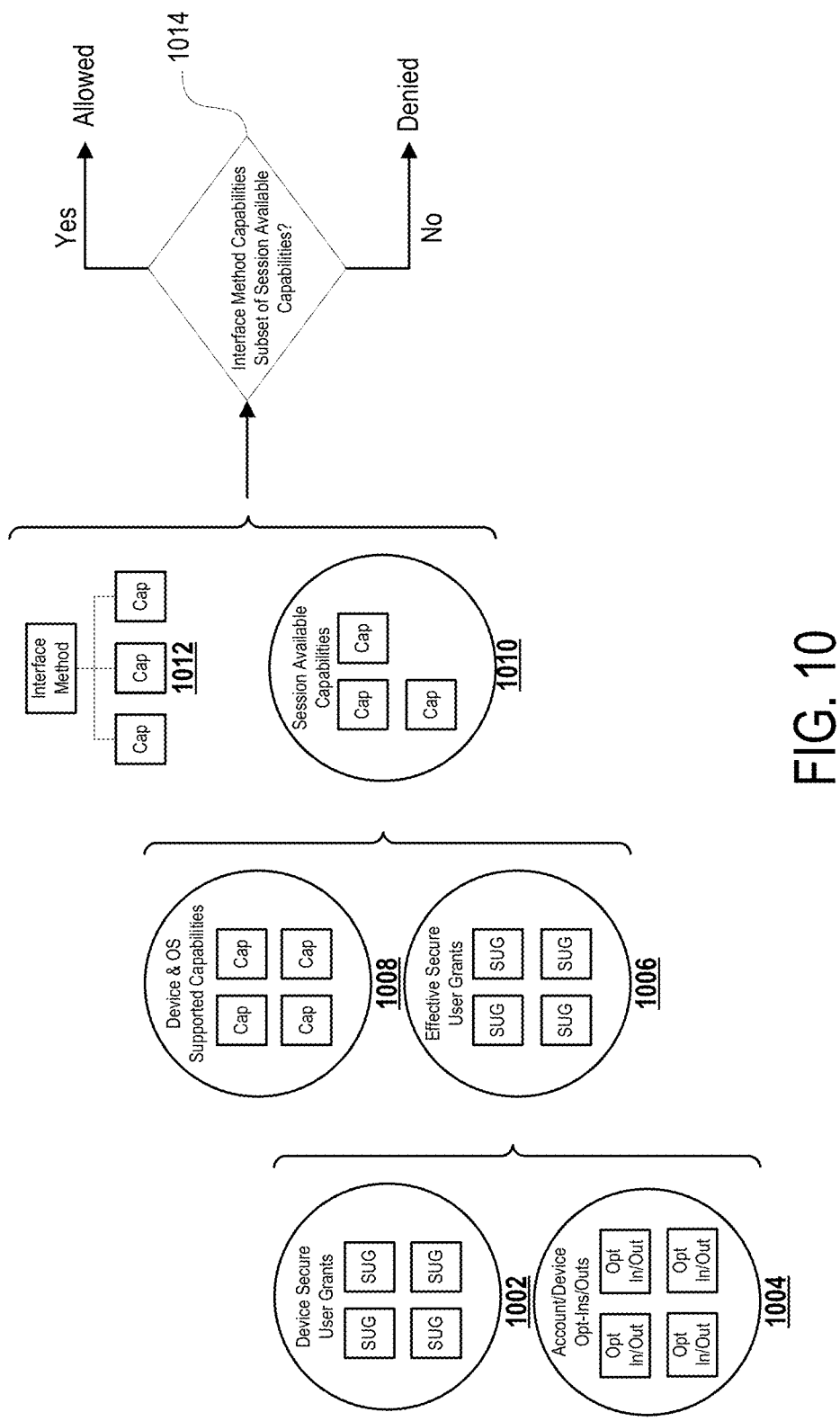
FIG. 10 shows examples of OS permissioning and policy execution.

FIG. 10 shows examples of OS permissioning and policy execution. In this example, one or more device secure user grants 1002 may be combined with any account/device opt-ins and out-outs to determine one or more effective secure user grants 1006. For example, the one or more secure user grants 1002 that are defined for the device may be filtered through any account/device opt-ins and/or opt-outs 1004, and any remaining secure user grants may become part of the effective secure user grant(s) 1006. The effective secure user grant(s) 1006 may then be filtered through any device and OS supported capabilities 2008 to determine one or more session available capabilities 1010. The session available capabilities 1010 may be capabilities that are available to the app for use for that particular session. The session may be defined by the lifespan (e.g., single use, while the app is active, while the device is active, until the grant is removed, for a specific time (e.g., time-to-live (TTL)), etc.) of the secure user grant. When a method (e.g., an interface method) is called by the app, one or more capabilities that are associated with (e.g., required by) the method (1012) may be compared against the session available capabilities 1010. For example, at step 1014, the app may determine whether the one or more method capabilities 1012 are a subset of the session available capabilities 1010. If the method capabilities 1012 are a subset of the session available capabilities 1010 (e.g., if all of the one or more method capabilities 1012 are capabilities 1010 currently available during the session), then the method call may be allowed. Otherwise, the method call may be denied.

FIGS. 11A and 11B show examples of permission execution. In an example process 1100a may include an app 1102 (e.g., a FIREBOLT app), an SDK 1104 (e.g., a FIREBOLT SDK), an OS 1106 (e.g., FIREBOLT), and an OS (e.g., FIREBOLT) or cloud service 1108. The app 1102 may make a method call via a software library (e.g., the SDK 1104 (1110)). The SDK 1104 may attempt to validate the method call via the OS 1106 (1112). For example, the SDK 1104 may send a method validation request message to the OS 1106. The OS 1106 may validate (1) whether one or more capabilities associated with the method call are available (e.g., for the OS and/or the device to execute), and/or (2) whether a distributor (e.g., the distributor of the app 1102) has granted permission to those one or more capabilities (e.g., has not opted out of those capabilities). If the OS 1106 validates the method call (e.g., the capabilities are available and the distributor has granted permission to the capabilities), then the OS 1106 may grant the SDK 1104 permission to the method call (1114). If the SDK 1104 has obtained grant to the method from the OS 1106, the SDK 1104 may execute the method (1116). Execution of the method may be done via the OS or cloud service 1108. The OS or cloud service 1108 may be the same as the OS 1106 or it may be a separate service (e.g., a cloud service). Upon execution of the method, the OS or cloud service 1108 may send back to the SDK 1104 a method response (1118). The SDK 1104 may send the method response to the app 1102 (1120). However, if the OS 1106 denies the method call (e.g., the capabilities are unavailable and/or the distributor has opted out of the capabilities), the OS 1106 may deny the method call (1114), and the SDK 1104 may send a method denied message to the app 1102 (1120).

An example process 1100*b*, as shown in FIG. 111B, may be similar to the example process 1100*a* of FIG. 11A except where otherwise noted. For example, when the SDK 1104 sends a method validation request 1112 to the OS 1106, the OS 1106 may validate (1) whether one or more capabilities associated with the method call are available (e.g., for the OS and/or the device to execute), (2) whether a distributor (e.g., the distributor of the app 1102) has granted permission to the one or more capabilities (e.g., has not opted out of those capabilities), and/or (3) whether a user 1122 (e.g., a user associated of the app 1102) has granted permission to the one or more capabilities (e.g., has previously opted in for the capabilities and/or has given express permission). If the OS 1106 determines that all other criteria have been met (e.g., the capabilities are available and the distributor has granted permission to the capabilities) but the user 1122 has not granted permission yet, then the OS 1106 may render an appropriate challenge (1124). For example, a secure user grant policy may define one or more acceptable actions by which the end user 1122 may grant access. The appropriate challenge may be, for example, one or more of an acknowledgement dialog, a personal identification number (PIN) dialog, an input of credentials, a one-time password (OTP), biometrics (e.g., fingerprint, facial recognition, iris recognition, etc.), navigating to another app that is responsible for satisfying the capability, an "allowed" privacy setting (e.g., opt-in), etc. For example, the OS 1106 may present a grant access dialog 1126 to the user 1122. For example, the grant access dialog 1126 may ask the user 1122 to input an acknowledgement (e.g., for granting permission to the capabilities), a PIN, credentials, an OTP, and/or biometrics. However, depending on the secure user grant policy, one or more other challenges (e.g., navigating to another app, an "allowed" privacy setting, etc.) may be used instead of the grant access dialog 1126. If the user 1122 grants permission via the grant access dialog 1126 (1128), the grant access dialog 1126 may send a response message 1130 to the OS 1106. The response message 1130 may indicate whether the user has granted or denied the request. If the OS 1106 has successfully validated all three criteria as set forth above, including receiving the response message 1130 indicating the permission grant, then the OS 1106 may send a permission grant message 1114 to the SDK 1104. If, on the other hand, the user 1122 denies the request (1128), then the grant access dialog 1126 may send a response message 1130 indicating that the user 1122 has denied the request, and the OS 1106 may send the message 1114, to the SDK 1104, indicating that permission to the method call has been denied. If the SDK 1104 receives the message 1114 granting permission, then the SDK 1104 may execute the method (1116). If, on the other hand, the SDK 1104 receives the message 1114 denying permission, then the SDK 1104 may send a method denied message to the app 1102 (1120).

The OS (e.g., FIREBOLT) may execute the permission model, but the policy definition may be controlled, managed, and/or owned by each distributor. The policy definition may set forth, for example, (1) whether an app can access one or more OS capabilities, and (2) what type of acknowledgement a user needs to provide for those capabilities. One or more apps may define capabilities that they are associated with (e.g., require), and the OS may execute permission checks at request time. The distributors may define capabilities that are offered (e.g., that may be opted in) and rules for offering those capabilities.

FIG. 12 shows examples of permissioning and policy execution. According to an example process 1200, according to an OS API, for an app distributed by a distribution platform. Each of the components shown in FIG. 12 may be implemented with hardware, software, or a combination of both. The process 1200 may involve a subscriber platform 1202 and a distribution platform 1204. An app 1206 may be distributed by the distribution platform 1204. An OS implementor 1208 (e.g., a FIREBOLT implementor) may configure specifics of the OS implementation via a distribution platform portal 1210*a* and a versioned OS implementation endpoint 1212 of the distribution platform 1204. A global application platform owner 1214 may define OS (e.g., FIREBOLT) version primitives via a distribution platform portal 1210*b* and via a capability endpoint 1216, a versioned interface endpoint 1218, and/or an interface method endpoint 1220 of the distribution platform 1204. The global application platform owner 1214 may also configure user grant override 1222 via the distribution platform portal 1210*b*. A distributor 1224 may set up (e.g., define) distributor-specific configurations (e.g., opt-out configuration 1230, OS configuration 1232, app manifest 1234, etc.) via a distribution platform portal 1210*c* and via a partner endpoint 1226 of the distribution platform 1204, a partner user/grant endpoint 1228 of the distribution platform 1204, a negotiated application permissioning endpoint 1236 of the distribution platform 1204, an opt-out type endpoint 1238 of the subscriber platform 1202, and/or an opt-out user grant endpoint 1240 of the subscriber platform 1202.

The distribution platform 1204 may include one or more OS configurations 1232 and one or more application manifests 1234. The OS configuration 1232 may include information regarding one or more platform capabilities, one or more OS methods, one or more method/capability relationships, one or more partners, and/or one or more partner-centric user grant override(s). The app manifest 1234 may include information regarding one or more application capabilities, one or more used platform capabilities, one or more distributor-granted platform capabilities, and/or one or more app-specific user grant overrides. The subscriber platform 1202 may include one or more opt-out configurations 1230. The opt-out configuration 1230 may include information regarding one or more opt-out types and/or one or more opt-out user grants. The opt-out configuration 1230 may include one or more opt-in configurations that include information regarding one or more opt-in types and/or one or more opt-in user grants. The opt-out configuration 1230 may include privacy settings pertaining to the end user 1242.

An end user 1242 may update one or more opt-outs via an app (e.g., a FIREBOLT app) and/or a portal such as a subscriber platform opt-outs endpoint 1244. The end user 1242 may be a subscriber and use the subscriber platform 1202 to update any opt-in/-out states in the opt-out configuration 1230. The subscriber platform opt-out endpoint 1244 may send one or more opt-out state change events, indicating any changes to the opt-out configuration 1230, to a data platform 1246.

The app 1206 (e.g., a FIREBOLT app) may include an OS SDK 1248 (e.g., FIREBOLT SDK). The app 1206 may make a method call 1250 to an OS 1252 (e.g., FIREBOLT). The OS 1252 may execute on a same hardware device as the app 1206 or on a separate hardware device from a device on which the app 1206 executes. The OS 1252 may make a series of determinations to determine whether to grant and/or execute the method 1250. If any of the determinations fails (e.g., determined to be negative), the OS 1252 may deny the method call 1250. At step 1254, the OS 1252 may determine, based on the OS configuration 1232, one or more capabilities that are associated with (e.g., required for) the method 1250. The OS 1252 may, for example, check the OS configuration 1232 for capabilities for the method call 1250. At step 1256, the OS 1252 may validate, based on the OS configuration 1232, that the distribution platform 1204 provides necessary capabilities. The OS 1252 may, for example, check the OS configuration 1232 for capability support. If the distribution platform 1204 does not provide all the necessary capabilities, then the OS 1252 may deny the method call 1250. Otherwise, at step 1258, the OS 1252 may validate, based on the app manifest 1234, that the distribution platform 1204 grants capabilities to the app 1206. The OS 1252 may, for example, check the app manifest 1234 for distributor capability grant(s). If the distribution platform 1204 does not grant any of the capabilities to the app 1206, the OS 1252 may deny the method call 1250. Otherwise, at step 1260, the OS 1252 may determine, based on the OS configuration 1232 and/or the app manifest 1234, whether any of the capabilities require user permission. The OS 1252 may, for example, check the OS configuration 1232 for capability secure user grant polic(ies) and any distributor override(s). The OS 1252 may also check the app manifest 1234 for any app override(s). If none of the capabilities requires user permission, then the OS 1252 may grant the method call 1250. If, however, one or more capabilities require user permission, then at step 1262, the OS 1252 may determine, based on the OS configuration 1232, whether the OS 1252 has valid secure user grant(s) that grant the one or more capabilities. The OS 1252 may, for example, check the OS configuration 1232 for secure user grant(s) granting capability support.

At step 1264, the OS 1252 may determine whether permission(s) for the capabilities have been already granted. At step 1266, the OS 1252 may determine, based on the opt-out configuration 1230, whether the already granted permissions are bound to any opt-outs. The OS 1252 may, for example, check the subscriber platform 1202 (e.g., the opt-out configuration 1230) for any opt-out grant(s). If any of the permissions are bound to an opt-out, then the OS 1252 may deny the method call 1250. At step 1268, the OS 1252 may determine, based on the opt-out configuration 1230, whether any permissions are granted by an opt-out (e.g., opt-in). The OS 1252 may, for example, check the subscriber account's opt-out state via the subscriber platform opt-outs endpoint 1244 and/or the subscriber platform 1202. At step 1270, the OS 1252 may determine, based on the app manifest 1234, whether there is an app that can request permission (e.g., permission-granting app 1272). At step 1274, the OS 1252 may delegate to the permission-granting app 1272 to request end user permission. The permission-granting app 1272 may be the same as the app 1206, which made the method call 1250, or a separate app from the app 1206. The permission-granting app 1272 may, for example, present a user interface (e.g., a dialog box) to the end user 1242 to receive permission. If the end user 1242 does not grant permission or denies permission, then the OS 1252 may deny the method call 1250. Otherwise, the OS 1252 may grant the method call 1250, and also update the OS permission state based on the secure user grant policy at step 1276 and/or update the opt-in/-out configuration 1230 at step 1278. The OS 1252 may, for example, update the subscriber account's opt-out state (e.g., the opt-out configuration 1230 pertaining to the end user 1242) via the subscriber platform opt-outs endpoint 1244.

In an example data sharing environment, an owner (e.g., distributor) of a first application may require opting-in for using a second application's data. The first application may receive, from an OS (e.g., FIREBOLT), an event for a new account link (e.g., an "Account Link Established" event) and thereby establish an account link between the app and the OS. The OS may check the capabilities of the linked app (e.g., the first app) and determine that the app offers one or more types of data sharing capabilities (e.g., SHARE_TARGETING_DATA). The first app may register to use, for example, the second app's targeting data (e.g., registerForTargetingData( )), which may trigger the secure user grant attached to the targeting capability. The OS may check any privacy setting(s) associated with the targeting data. If the setting(s) are not currently allowed, the OS may present a user interface, such as a dialog box (e.g., "Do you want to allow [the first application] to use [the second application's] data for targeting?"), and ask whether or not the user would like to grant permission for data sharing. The privacy setting(s) may be updated accordingly.

Figure 13:
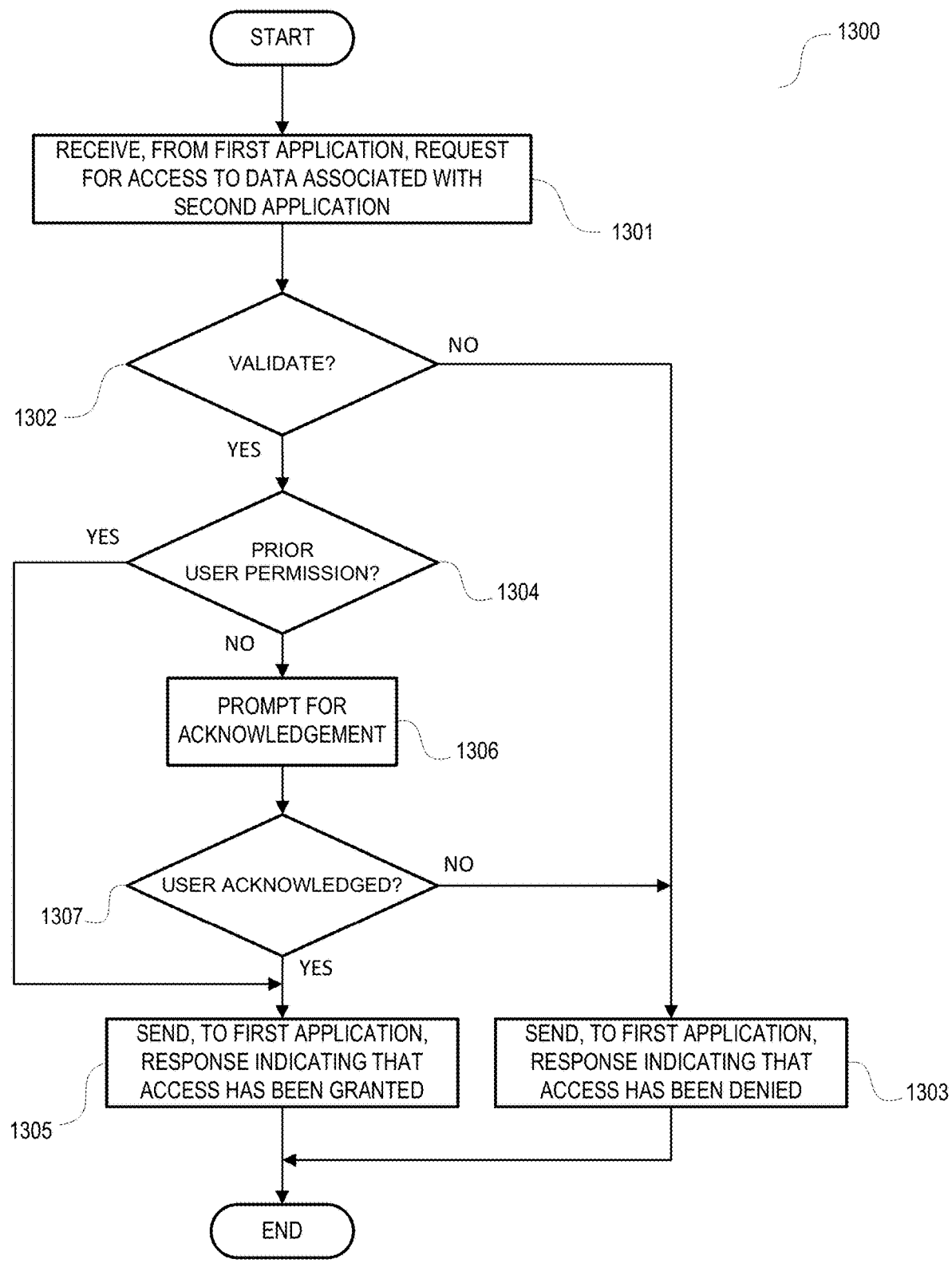
FIG. 13 is a flow chart showing an example method for accessing data associated with an application.

FIG. 13 is a flow chart showing an example method 1300 for accessing data associated with an application. The method 1300, or one or more operations of the method, may be performed by one or more computing devices or entities as disclosed herein. The method 1300 may be performed by any of the hardware, software, or a combination thereof as described in the present disclosure. The method 1300 may be performed by one or more of the devices and components shown in FIGS. 1-12. For example, the method 1300 may be performed by computing device 200 of FIG. 2, the OS 704 of FIG. 7, the OS 1106 of FIGS. 11A and 11B, the OS 1252 of FIG. 12, etc. The OS may execute on a same hardware device as the first application and/or the second application. The method 1300 or one or more steps thereof may be embodied in computer-executable instructions that are stored in a computer-readable medium, such as a non-transitory computer readable medium. The steps in this flow chart need not all be performed in the order specified. Some steps may be omitted or changed in order. New step(s) not shown in FIG. 13 may be added.

At step 1301, the OS may receive, from a first application executing on a computing device, a request for access to data associated with a second application. The OS may be executing on the computing device. The second application may be executing on the computing device or on a different computing device. At step 1302, the OS may validate granting the first application access to the data. For example, the OS may determine whether to grant the first application access to the data. The OS may perform validation based on one or more capabilities of the computing device, one or more capabilities declared (e.g., required) by the first application, an acknowledgement (e.g., a prior acknowledgement, an opt-in, etc.) by a user associated with the second application, and/or an organization data sharing policy associated with the second application. For example, the OS may successfully validate by determining that one or more capabilities of the computing device allow the access to the data, that one or more capabilities declared (e.g., required) by the first application allow the access to the data, and/or that an organization data sharing policy associated with the second application allows the access to the data. The OS may access the organization data sharing policy stored in a database associated with the OS. The acknowledgement may include authorization by the user to grant the access to the data. The organization data sharing policy may be set by a distributor of the second application. The OS may determine the one or more capabilities of the computing device based on accessing an operating system configuration. The OS may determine one or more capabilities declared by the first application based on accessing an application manifest. The one or more capabilities of the computing device may include a screen size, a screen resolution, a memory size, a processor speed, a network bandwidth, a microphone, a speaker, a camera, a sensor, an input device, and/or wireless communication. The one or more capabilities of the computing device may include an ability to provide the application with personally identifiable data, such as name, age, gender, address, username, email address, etc. The one or more capabilities declared by the first application may include a required capability and/or an optional capability.

If the OS does not successfully validate the access (1302: NO), at step 1303, the OS may send, to the first application, a response indicating that the request has been denied (e.g., access is denied). If the OS successfully validates the access (1302: YES), the OS may, at step 1304, determine whether the user has previously acknowledged access (e.g., opted in). If the user has previously acknowledged access (1304: YES), then at step 1305, the OS may send, to the first application and based on the determination, a response indicating that the access has been granted.

If the user has not acknowledged access (1304: NO), then at step 1306, the OS may cause the computing device to prompt for a user input from the user. The OS may obtain a user acknowledgement of granting the access to the data. The user input may include the acknowledgement. The user input may further include a personal identification number, a username, a password, a one-time password, and/or biometrics.

At step 1307, the OS may determine whether the user has acknowledged (e.g., via a user input) the access. If the user has not acknowledged the access (1307: NO), at step 1303, the OS may send, to the first application, a response indicating that the request has been denied (e.g., access is denied). If the user has acknowledged the access (1307: YES), at step 1305, the OS may send, to the first application and based on the determination, a response indicating that the access has been granted.

Steps in FIG. 13 may be performed in any order. For example, step 1302 may be performed after step 1304 and/or step 1307. For example, based on the user acknowledgement and further based on a determination that an organization data sharing policy prohibits (e.g., opt-out) sharing of the data, the OS may send, to the first application, a response indicating denial of the access.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, at a first time and from an application executing on a computing device, an application manifest associated with the application, wherein the application manifest comprises a declaration of a usage, by the application, of privacy-controlled data;
receiving, at a second time later than the first time and from the application, a request message for access to second data associated with an entity, wherein the second data comprises the privacy-controlled data;
granting the access to the second data, based on:
an operating system method call supported by the computing device; and
the declaration of the usage, by the application, of the privacy-controlled data; and
sending, to the application, a response message indicating that the access has been granted.

2. The method of claim 1, wherein the entity comprises at least one of a second application, an operating system, or a cloud service.

3. The method of claim 1, wherein the granting the access is further based on an organization data sharing policy that comprises at least one of a distributor override, an opt-in, or an opt-out.

4. The method of claim 1, wherein the granting the access is further based on an authorization, by a user associated with the entity, to grant the access to the second data.

5. The method of claim 1, wherein the granting the access is further based on an organization data sharing policy that indicates one or more sharing policies of a distributor of the entity.

6. The method of claim 1, further comprising causing the computing device to prompt a user for a user input, and wherein the granting the access is further based on the user input.

7. The method of claim 1, wherein the granting the access is further based on an input, received from a user associated with the entity, comprising at least one of:
a personal identification number;
a username;
a password;
a one-time password; or
biometrics.

8. The method of claim 1, further comprising determining, based on an operating system configuration associated with the computing device, the operating system method call supported by the computing device.

9. The method of claim 1, wherein the application manifest further comprises declarations of:
one or more capabilities of the application,
whether the one or more capabilities of the application are required or optional,
an identifier of the application,
a launch method of the application, and
a launch configuration of the application.

10. The method of claim 1, wherein the operating system method call supported by the computing device is associated with at least one of a screen size of the computing device, a screen resolution of the computing device, a memory size of the computing device, a processor speed of the computing device, a network bandwidth of the computing device, a microphone of the computing device, a speaker of the computing device, a camera of the computing device, a sensor of the computing device, an input device of the computing device, wireless communication of the computing device, or an ability of the computing device to provide the application with personally identifiable data.

11. The method of claim 1, wherein the declaration of the usage comprises at least one of:
  a required capability associated with the privacy-controlled data, or
  an optional capability associated with the privacy-controlled data.

12. A method comprising:
  receiving, from an application executing on a computing device, a request for access to data associated with an entity;
  receiving, based on the request for access, a message indicating that a user of the entity granted the requested access to the data;
  retrieving a first organization data sharing policy associated with the application;
  accessing, based on the indication that the user granted the requested access, a database to retrieve a second organization data sharing policy associated with the entity, wherein the second organization data sharing policy comprises an indication of a type of data that the entity allows for sharing, and wherein the second organization data sharing policy is different from the first organization data sharing policy; and
  sending, to the application and based on the first organization data sharing policy and the second organization data sharing policy, a response indicating denial of the requested access.

13. The method of claim 12, wherein the entity comprises at least one of a second application, an operating system, or a cloud service.

14. The method of claim 12, wherein the second organization data sharing policy comprises at least one of an opt-in or an opt-out.

15. The method of claim 12, wherein the first organization data sharing policy indicates one or more sharing policies associated with a distributor of the application, and wherein the second organization data sharing policy indicates one or more sharing policies associated with the entity.

16. The method of claim 12, wherein the entity is associated with an organization, and wherein the second organization data sharing policy prohibits sharing, with the application, of the data associated with the entity.

17. The method of claim 12, wherein the receiving the message comprises causing the computing device to prompt for a user input, from the user, granting the requested access.

18. The method of claim 12, wherein the receiving the message comprises receiving, from the user, at least one of:
  a personal identification number;
  a username;
  a password;
  a one-time password; or
  biometrics.

19. The method of claim 12, wherein the sending the response is further based on at least one of:
  one or more capabilities of the computing device, or
  one or more capabilities declared by the application.

20. A method comprising:
  receiving, from a first application executing on a first computing device, a request for access to data associated with a second application executing on a second computing device, wherein the first application is associated with a first organization data sharing policy, and wherein the second application is associated with a second organization data sharing policy different from the first organization data sharing policy;
  validating the access based on operating system method calls supported by the first computing device and further based on the first organization data sharing policy and the second organization data sharing policy;
  receiving, from a user associated with the second application, a user input authorizing the access; and
  sending, to the first application and based on the validation and the user input, a response message indicating that the access has been granted.

21. The method of claim 20, wherein the second organization data sharing policy comprises at least one of a distributor override, an opt-in, or an opt-out.

22. The method of claim 20, wherein the user input is received before the receiving the request for the access.

23. The method of claim 20, wherein the second organization data sharing policy indicates one or more sharing policies of a distributor of the second application.

24. The method of claim 20, wherein the user input comprises at least one of:
  a personal identification number;
  a username;
  a password;
  a one-time password; or
  biometrics.

25. The method of claim 20, wherein the validating the access is further based on at least one of a screen size of the first computing device, a screen resolution of the first computing device, a memory size of the first computing device, a processor speed of the first computing device, a network bandwidth of the first computing device, a microphone of the first computing device, a speaker of the first computing device, a camera of the first computing device, a sensor of the first computing device, an input device of the first computing device, or wireless communication of the first computing device.

* * * * *